US006408262B1

(12) United States Patent
Leerberg et al.

(10) Patent No.: US 6,408,262 B1
(45) Date of Patent: Jun. 18, 2002

(54) METHOD AND AN APPARATUS FOR ANALYZING A STATE BASED SYSTEM MODEL

(75) Inventors: Henrik Leerberg, Aarhus; Henrik Hulgaard, Kbh.; Jørn Bo Lind-Nielsen, København; Henrik Reif Andersen, Bagsværd; Kim Guldstrand Larsen, Arden; Kåre Jelling Kristoffersen; Gerd Behrmann, both of Aalborg, all of (DK)

(73) Assignee: IAR Systems A/S, VibyJ (DK)

( * ) Notice: Subject to any disclaimer, the term of this patent is extended or adjusted under 35 U.S.C. 154(b) by 0 days.

(21) Appl. No.: 09/116,835

(22) Filed: Jul. 17, 1998

(30) Foreign Application Priority Data

Mar. 27, 1998 (DK) ................................................ 437/98

(51) Int. Cl.⁷ .......................... G06F 17/50; G06F 17/10
(52) U.S. Cl. ................................. 703/2; 703/22; 716/2
(58) Field of Search ........................ 703/2, 22; 716/19, 716/5, 2

(56) References Cited

U.S. PATENT DOCUMENTS

| 5,465,216 A | | 11/1995 | Rotem et al. ................... 716/5 |
| 5,493,508 A | * | 2/1996 | Dangelo et al. ............... 716/19 |
| 5,910,897 A | * | 6/1999 | Dangelo et al. ................ 716/5 |

OTHER PUBLICATIONS

J. Straunstrup et al., Practical Verification of Embedded Software, Computer, vol. 33, No. 5, May 2000, pp. 68–75.*
V. Hartonas–Garmhausen et al., Deadlock Prevention in Flexible Manufacturing systems Using Symbolic Model Checking, 1996 IEEE International Conference on Robotics and Automation, 1996, vol. 1, pp. 527–532.*

T.A. Henzinger et al., HYTECH: The Next Generation, Real–Time Systems Symposium, 1995, 16th IEEE Proceedings, pp. 56–65.*

J.R. Burch et al., Symbolic Model Checking: 10/sup 20/ States and Beyond, Fifth Annual IEEE Symposium on Logic in Computer Science, 1990, LICS '90 , pp. 428–439.*

* cited by examiner

*Primary Examiner*—Russell Frejd
(74) *Attorney, Agent, or Firm*—Finnegan, Henderson, Farabow, Garrett & Dunner, LLP

(57) ABSTRACT

The invention relates to methods and apparatus for analyzing a state based system model comprising a set of machines (M1, . . . ,Mn), said machines each comprising at least one possible state (pS1Mi, . . . ,pSkMi), each machine being in one of its comprised states at any given time, the dynamic behavior of said machines (M1, . . . ,Mn) being defined by predefined transitions between said states of each machine (M1, . . . ,Mn) and dependencies (D) between said machines (M1, . . . ,Mn) , initiating an initial set of at least one machine state (F) of said machines (M1, . . . ,Mn), initiating a goal set of machine states (A) representing a condition on states of a subset of machines (MI), and repeating the following steps until the analyzing has terminated positively and/or if the subset of machines (MI) comprises all of said machines (M1, . . . ,Mn), expanding the goal set (A) with a set of states which via transitions can be bought into the previous goal set (A) independently of machines not included in (MI), if (A) comprises at least one of the machine states in the initial set of states (F) then terminating positively, otherwise expanding the subset of machines (MI) with at least a subset of the machines (M1, . . . ,Mn).

82 Claims, 15 Drawing Sheets

METHOD AND AN APPARATUS FOR ANALYZING A STATE BASED SYSTEM MODEL

FIELD OF THE ART

The invention relates to a method of analyzing a state based system model comprising a set of machines as stated in the independent claims 1, 11 and 29.

BACKGROUND OF THE INVENTION

When considering the fact that many product segments of the market tend to comprise an increasing amount of embedded software, and as the products within said segments tend to be differentiated more and more only by the performing differences of the embedded software rather than the utilized hardware, the future demands of software designs in general will vary greatly with respect to both the above-mentioned fault recognition and elimination and the short-term development deadlines.

One of many examples of relevance may be within the automotive industry. Even mass-produce cars tend to comprise an increasing number of dedicated microprocessors. The microprocessors may, e.g., be dedicated to control ABS, fuel injection, light control, different kinds of monitoring,, heat control, security systems, etc., and many of the different subsystems will often have to be controlled by a common protocol.

It is evident that the large, scale appearance of software-controlled units will cause increasing troubles to the system designers, as it may be difficult to overview every aspect of the possible state of each unit, and of course it may be even more complicated to keep track of the synergy between all the subsystems utilized. A further difficulty which should be mentioned is that most of the subsystems will be designed by different developers or groups of such, and that the interfaces between such subsystems may be difficult to control as no effective tools can be provided to the developers for the necessary analyses of such large-scale systems together or even in every single unit.

This may cause expensive and crucial delays with respect to the duration of the product development and releasing. It is even more crucial that some products may even be put on the market with inherent hidden errors which under certain unknown conditions, may be triggered and come to light.

This problem is of course really serious in safety critical systems where a defect or fault may even cause injury to persons affected by such a defect.

One way of testing such types of products is to check the logic design prior to the fabrication of a device through symbolic model checking. The technique has turned out to be very efficient for analyses and verification of hardware systems. However, it has not been clear whether model checking is an effective tool for other types of concurrent systems such as e.g. software systems.

One reason why symbolic model checking may not be as efficient is that software systems tend to be both larger and less regularly structured than hardware. For example, many of the results reported for verifying large hardware systems have been for linear structures like stacks or pipelines, for which it is known that the size of the transition relation when represented as a so-called ROBDD, Reduced Ordered Binary Decision Diagrams, grows linearly with the size of the system.

Another approach to this is described in U.S. Pat. No. 5,465,216 in which a method of automatic design verification is described. The described method basically accepts the fact that the formal verification suffers from a deficiency of "the state explosion problem", and furthermore concludes that formal verification of very large systems are beyond the capabilities of the current formal verification techniques. Hence, the above-mentioned patent describes a way of decomposing and reducing the systeM model instead of dealing with the verification method. Consequently, a drawback of the described method is that the possibly obtainable results will only be partial and non-exhaustive.

A more promising technique, based on the above-mentioned ROBDDs, which also exploits the structure of the system is presented in W. Lee et al., Tearing based automatic abstraction for CTL model checking, 1996 IEEE/ACM International Conference on Computer-Aided Design, pages 76–81, San Jose, Calif., 1996 IEEE Comput. Soc. Press. This technique uses a partitioned transition relation, and a greedy heuristic is used to select subsets of the transition relation. For each chosen subset, a complete fixed point iteration is performed. If the formula cannot be proven after this iteration, a larger subset is chosen. In case of an invalid formula the alogrithm only terminates when the full transition relation has been constructed (or memory or time has been exhausted). A draw-back of the technique is that it uses a greedy strategy involving a fixed-point iteration for each of the remaining machines. If the system only has a single initial state, as is typical in embedded software systems. The greedy strategy reduces to selecting an arbitrary machine, thus involving extraneous fixed point iterations.

The present invention meets the requirement of both a formal verification and a use of an unreduced system model and provides the possibility of performing theoretical model "crash tests" in even very large-scale state based system models. Moreover, analyses and verification of the said models can be achieved in non-reduced models at a much higher rate than prior art analyses and verification tools.

SUMMARY OF THE INVENTION

When the method of analyzing a state based system model comprises a set of machines (M1, . . . ,Mn), said machines each comprising at least one: possible state (pS1Mi, . . . , pSkMi) each machine being in one of its comprised states at any given time, the dynamic behavior of said machines (M1, . . . ,Mn) being defined by predefined transitions between said states of each machine (M1, . . . ,Mn) and dependencies (D) between said machines (M1, . . . ,Mn), initiating an initial set of at least one machine state (F) of said machines (M1, . . . ,Mn)

initiating a goal set of machine states (A) representing a condition on states of a subset of machines (MI), and repeating the following steps until the analyzing has terminated positively and/or if the subset of machines (MI) comprises all of said machines (M1, . . . ,Mn) expanding the goal set (A) with a set of states which via transitions can be brought into the previous goal set (A) independently of machines not included in (MI), if (A) comprises at least one of the set of states in the initial set of states (F) then terminating positively, otherwise expanding the subset of machines (MI) with at least a subset of the machines (M1, . . . ,Mn).

it is possible to obtain a very fast analysis of a state based system model.

Thus, according to the above, the invention deals with a dynamic expansion of a given investigated set of possible states A in a state based system model with the states within the currently investigated machine or set of machines. When the possible states A cannot be expanded any more, i.e. all states in the investigated machines are possible, or when the rest of the states are only possible if certain conditions in other machines is fulfilled, the number of investigated machines is increased and the set of possible states is expanded. This iterative process may continue until certain results are obtained. A desired result could for instance be a verification that a given machine state can be brought into the set of possible initial states A.

Specifically, the invention provides an accurate result when performing so-called reachability check, i.e. when verifying that a set of initial machine states can be brought into certain desired or undesired conditions.

Experimental results have shown that typical so-called reachability checks according to the invention can be performed considerably faster than prior art methods.

Moreover, according to the invention, it is now possible to analyze and verify system models comprising an extremely large number of machines, as no full calculation of all possible global state vectors has to be determined. This important aspect increases the possibility of creating very large state based systems, as a true model of the system can now be established and analyzed completely before marketing of the product, thus eliminating the risk of bringing products on the market with inherent hidden errors.

As many product segments of the market tend to comprise an increasing amount of embedded software, and as the products within said segments tend to be differentiated more and more only by the performing differences of the embedded software rather than the utilized hardware, the future demands of software designs in general will be very great with respect to both the above mentioned fault recognition and elimination and the short-termed development deadlines.

The invention meets the requirement of such a tendency, as the invention provides the possibility of performing theoretical model "crash tests" in even very large-scale state based system models, and moreover analysis and verification of the said models can be achieved in non-reduced models at much higher rate than prior art analyses and verification tools.

It should be noted that the type of test criteria established may vary widely within the scope of the invention. Examples of this could be a verification, an indication of potential dead-lock or, if necessary, a specific and accurate detection of such a dead-lock.

A further advantageous feature of the invention is that the basic compositional structure of step by step expanding the previous search result makes it possible to reuse previously obtained analysis results. Thus, even if a complete investigation of all machines in a system model would become necessary, much will be gained, as no unnecessary calculations will have to be made during the ongoing analyses.

Due to an acknowledgment of a central monotonicity results the previously computed portion of the state space can be reused instead of having to start from scratch each time a new machine is added as in known techniques.

Even when all machines are needed, experiments have shown that the inventive method of including machines one at a time, i.e. exploiting the monotonicity property, is faster than performing a so called traditional fixed-point iteration using a partitioned transition relation and early variable quantification.

It should be emphasized that the invention has no restrictions with respect to the way of defining the system "components". The invention is for instance not restricted to simple so-called flat state system models. According to the invention a system may e.g. be defined as a hierarchical state event system comprising hierarchical machines and/or hierarchical states. Bearing this in mind, the invention is preferably advantageously performed in a flat system model, which means that hierarchical systems should preferably be transformed into flat models before an analysis according to the invention is initiated.

According to the invention, states in a system model may, e.g., comprise discrete observations, values of programming variables or registers or latches of a sequential circuit, observations of continuous and time-dependent functions such as temperature, time, speed, altitude, position. Moreover, as mentioned above, states may themselves be system models providing so-called hierarchical system models.

Dependencies are derived from conditions on transitions on other machines in the system model.

Conditions on transitions are either conditions on the current state of other machines in the system model or conditions on the current state of the environment of the system model.

Moreover, it should be noted that variations of the expansion criteria or termination conditions may be applicable within the scope of the invention.

When the step of expanding (MI) with at least a subset of the machines (M1, . . . ,Mn) comprises an expansion of (MI) with at least a subset of machines upon which the previous (MI) depends, a very advantageous expansion of MI has been obtained.

The invention performs an analysis of a given system model by incorporating only the machines necessary for the current purpose, i.e. only the machines on which the current evaluated transitions are dependent.

Thus, according to a very preferred embodiment of the invention the expansion of the current investigated MI with machines outside MI should be made, considering that machines without dependencies on the unexpanded set of machines MI would currently provide no further information. Thus, according to the above, preferred embodiment of the invention, the expansion of the Investigated set or machines MI is optimized with only the immediately necessary machines. As many analyses of real-life applications can be performed without evaluation of a considerable amount of machines in a system model, an extremely valuable analysis method can be obtained.

It will be appreciated that analyses of large-scale system models will benefit even more from this important feature, as the necessary evaluated space of the system model may be reduced considerably and a great number of evaluations may be avoided.

An important aspect of the above mentioned dynamic ongoing expansion is that a usable result, when analyzing very large scale system models, can only be obtained when considering the dependencies, as described above. Pilot test have in fact shown that almost impossible verifications in prior art systems can now be performed using modest resources on a standard PC.

A further important aspect of the invention is that the difficulties of analyzing reduced state system models may be eliminated or reduced significantly, as the invention can deal with unreduced system models. It should be noted that the invention may be regarded as a dynamically reduced system model, wherein only the absolutely necessary system model machines are dynamically determined and investigated. Thus, the invention benefits from the empirically shown general behavior of state based system models, namely that possible real-life analysis or verifications will only affect a part of all the system model machines.

Basically, it should be noted that transitions between machine states in a given machine are restricted only by the dependencies associated with the specific transitions. Hence, the present method according to the invention requires that a transition without dependencies may be triggered by an event at any given time.

It is evident that, if conditions do in fact exist on the above-mentioned events, they should be incorporated into the system model, if necessary.

The above-mentioned advantageous embodiment of the invention benefits from the structure of a state-based system model, as it deals with the fact that transitions are basically characterized in two different ways. Some transitions may be fired unconditionally, as they may only be dependent on certain known and always possible events, while the other transitions are bound by certain conditions or dependencies to other machines.

Thus, according to the above embodiment, the invention deals with a dynamic expansion of a given investigated set of possible states A in a state based system model. with the states within the currently investigated machine or set of machines. When the possible states A cannot be expanded any more, i.e. all states in the investigated machines are possible, or when the rest of the states are only possible if certain conditions in other machines are fulfilled, the number of investigated machines is increased and the set of possible states is expanded. According to the present embodiment it should be noted that the expansion only concerns the machines or some of the machines which have some kind of relevance to the currently investigated machine, i.e. if they have dependencies to the transitions in the currenly investigated. This iterative process may continue until certain result is obtained. A desired result could for instance be a verification that a given machine state can be brought into the set of possible states A.

It is evident that the above, preferred embodiment may reduce the duration of the iterations significantly, as the method, so to speak, dynamically neglects the part of the system model which comprises no relevant information for the currently investigated transitions and/or machines.

The present invention provides a technique that significantly improves the performance of. e.g. symbolic model checking on embedded reactive systems modeled using a state/event model or other state based models such as state charts.

The invention thus improves the convenience of utilizing state based models, e.g. the control portion of embedded reactive systems, including smaller systems, such as cellular phones, hi-fi equipment, and cruise controls for cars, and large systems, such as train simulators, flight control systems, telephone and communication protocols. The method according to the invention may thus e.g. be used in commercial tools to assist in developing embedded reactive software by allowing the designer to construct a state based model and analyze it by either simulating it or by running a consistency check. The tool automatically generates the code for the hardware of the embedded system. The consistency check is in fact a verification tool that checks for a range of properties that any state based model should have. Some of the checks must be passed for the generated code to be correct, for instance, it is crucial that the model is deterministic. Other checks are issued as warnings that might be design errors such as transitions that can never fire.

State based models can be extremely large. And unlike in traditional model checking, the number of checks is at least linear in the size of the model. The present invention reports results for models with up to 1421 concurrent state machines, and even much larger systems can easily be handled. For systems of this size, traditional symbolic model checking techniques fail, even when using a partitioned transition relation and backward iteration.

The present invention uses a compositional technique that initially considers only a few machines in determining satisfaction of the verification task and, if necessary, gradually increases the number of considered machines. The machines considered may advantageously be determined using a dependency analysis of the structure of the system.

A number of large state based models from industrial applications have been verified, and even the above-mentioned model with 1421 concurrent machines can be verified with modest resources. Compared with known analysis tools the results improve on the efficiency of checking the smaller instances and dramatically increase the size of systems that can be verified.

When the analyzing is terminated negatively after said step of expanding the goal set (A) with a set of states which can be brought into the previous goal set (A) independently of machines not included in (MI) if none of the machines in (MI) are dependent on machines outside (MI), a valid estimate of the system behavior is obtained, as the method according to the invention has been provided, since, when terminated when none of the machines in MI are dependent on machines outside MI, it can be evidently proved that the test criteria cannot be reached. Thus, the designers of even very large scale state based systems have the possibility of forecasting potential run-time problems.

It should be noted that the negative termination, of course, will be absolutely necessary in many applications, as an exact negative indication will often be of great value. In many types of analyses this negative indication is in fact what the user is looking for. Hence, it will be appreciated that the negative automatic termination itself will be of great importance, and the method of the invention will be far more effective and user-friendly when a kind of automatic termination is incorporated in the method when further iterations are meaningless. It should nevertheless be emphasized that other than this optimal stop criteria can be used.

On the other hand, the invention has the possibility of providing exact knowledge when speaking about positive control of test criteria representing non-desired states or combinations of states. Hence, if the method according to the invention proves that a certain state or a combination of states cannot be obtained under certain conditions, it can evidently be assumed that this situation will not occur in a real-life situation, even though the invention in fact utilizes only a part of the system model during the dynamic test situation. This feature is very important when speaking about a wide spectrum of process applications in which a fault, i.e. a non-desired state, may cause severe damage or confusion.

It should thus be emphasized that a negative as well as a positive termination of the analysis according to the invention may be determined with certainty, which is an extremely useful and valuable feature when performing tests on system models. The invention provides both a very high speed application and accurate and reliable results.

The information following the positive or negative termination can thus be adapted to represent any desired test condition.

Another aspect of the present embodiment of the invention is that optimal termination criteria may be of great importance in a large number of applications, as unnecessary iterations should be avoided, if possible. The above mentioned positive and negative stop criteria ensure that all, but no more than the necessary iterations will be calculated with respect to a reachability analysis. A person skilled in the art will be able to adapt the method of the invention to other desired analysis purposes.

When a visual or audio indication is provided to a user if, after said step of expanding the goal set (A) with a set of states which can be brought into the previous goal set (A) independently of machines not included in (MI), none of the machines in (MI) are dependent on machines outside (MI), a convenient environment of the information provided to a user is obtained.

It should be noted that a user-friendly interface is of even greater importance when a fast interactive process of analyzing can be expected. Not only may the process of analyzing a given system model be accelerated, but the whole design procedure of a state based system model may be shortened considerably.

When the analysis is terminated upon a request from the user, a further advantageous user interface is obtained. Such a kind of interface may e.g. be advantageous when handling large scale systems. Again, as mentioned above, it should be emphasized that the need for a user-friendly interface grows with the capability of the analysis method.

When the dependencies (D) are represented as a directed graph, a further advantageous embodiment is achieved.

A representation as a directed graph, which in itself is a well known data structure for representing dependencies between arbitrary objects, is a very convenient and optimal approach usable for a wide spectrum of analyzing applications.

When the increasing sets of machines (MI) are determined by a breadth-first traversal of the directed graph representing dependencies, a further advantageous embodiment is achieved, as it leads to a minimum dependency closed MI, and thus a fast termination.

This is due to the fact that it includes only the machines on which MI is immediately dependent.

Moreover this method is very efficiently computable.

When the sets of machine states ate represented as Reduced Ordered Binary Decision Diagrams (ROBDD's) and the operations upon them are carried out as efficient operations on Reduced Ordered Binary Decision Diagrams (ROBDD's), a further advantageous embodiment according to the invention is obtained.

Thus, efficient operations computing the image of a transition relation on a set of states can be obtained. It should be noted that a computation of the image of a transition relation requires the transition relation to be represented as a single ROBDD, which may sometimes cause problems due to a large size of the representation. In these cases the transition relation can be more efficiently represented as a disjunction or conjunction of smaller relations called, a partitioned transition relation.

When the transitions relation is represented as a partitioned transitions of Reduced Ordered Binary Decision Diagrams (ROBDD's), and the set of states (A) are dynamically computed by an iterative fixed-point iteration, a simple and efficient operation of the invention is obtained implemented by well known techniques in the art.

When the dynamic behaviour of said machines (M1, . . . , Mn) is defined by predefined transitions between said states of each machine (M1, . . . ,Mn) and dependencies (D) between said machines (M1, . . . ,Mn), for each machine (M1, . . . ,Mi, . . . ,Mn)
a subset of machines (MI) is initiated to comprise the currently analyzed machine (Mi)

a set (Ai) of living states (Ai) is initiated, said living states being the machine states of the currently analysed machine (Mi) which, independently of other machines, may change state to other possible states (pS1Mi, . . . , pS kMi) of said machine the following steps are initiated until the analysis has terminated or if (MI) comprises all machines (M1, . . . , Mn)

the set of living states (Ai) is expanded with a set of states which via transitions can be brought into the previous set of living states (Ai) independently of machines not included in (MI)

and/or a set of states which via transitions can be brought to change state of (Mi) independently of machines not included in (MI)

the analysis is terminated positively if (Ai) comprises all possible machine states in said machine (Mi), otherwise (MI) is expanded with at least a subset of the machines, a further advantageous embodiment is achieved.

As will be understood, the present embodiment of the invention will provide the possibility of detecting all the global states, i.e. a set of machine states, for each machine which may have the possibility to change state under certain possible conditions. Such states will be regarded as living states according to the present terminology.

It is moreover evident that determination of all the living states of each machine may give an indication of possible inherent traps, as a machine state for which a given machine which has no possible transitions to other states may be potential dangerous states, or so-called potential dead states.

It should nevertheless be emphasized that a potential dead state does not necessarily represent an undesired or illegal state. The determined state or states must in fact only be critical if they can be reached from known or given initial system conditions.

When the invention furthermore comprises the steps of each machine (Mi) having potential dead machine states (Adi) initiating an initial set of machine states (F) of said machine (M1, . . . ,Mn)

initiating a goal set of machine states (Adi) representing the potential dead machine states of machines (MI), and repeating the following steps until the analyzing has terminated and/or if the subset of machines (MI) comprises all of said machines (M1, . . . ,Mn)

expanding the goal set (Adi) with a set of states which via transitions can be brought into the previous goal set (Adi) independently of machines not included in (MI), if (Adi) comprises at least one of the states in the initial set of states (F) then terminating positively, otherwise expanding the subset of machines (MI) with at least a subset of the machines (M1, . . . ,Mn), further important knowledge about the investigated system model is obtained.

The meaning of a positive termination in the above embodiment of the invention is thus not especially postitive, as it has now been determined that the investigated state or combination of potential dead states can actually be reached. A dead-lock has thus been determined, and the machine Mi comprising the determined state or states will not be able to change state, no matter what happens in the surrounding system.

When the method of the invention comprises determining for at least one machine (Mi), at least one of, preferably all, the potential dead machine states (Adi) which, when said machine (Mi) is in any of said machine states (Adi), independently of possible external events, will remain in the same machine state (Adi), for each machine (Mi) having potential dead machine states (Adi) initiating an initial set of machine states (F) of said machines (M1, . . . ,Mn) .

initiating a goal set of machine states (Adi) representing the potential dead machine states of machines (MI), and repeating the following steps until the analysis has terminated and/or if the subset of machines (MI) comprises all of said machines (M1, . . . ,Mn)

expanding the goal set (Adi) with a set of states which via transitions can be brought into the previous goal set (Adi) independently of machines not included in (MI), if (Adi) comprises at least one of the states in the initial set of states (F) then terminating positively, otherwise expanding the subset of machines (MI) with at least a subset of the machines (M1, . . . ,Mn)

a very preferred embodiment of the invention is obtained, as a real dead-lock has been detected.

The invention provides a convincing method of detecting a very unpleasant type of faults, as a deadlock would cause a system, such as a state based system, to enter an endless loop, causing stressing and unreasonable working conditions for the user, at best.

It is evident that detection of reachable dead-locks in a system model provides extremely valuable information to the system designer, as an undetected dead-lock fault may cause severe damage if it should be detected or experienced by a user of a released product. Moreover, it should be emphasized that a fast dead-lock detection, as well as other test criteria, such as the above-mentioned verification analysis, will provide an impressive work tool to a market which is; extremely sensitive to release delays and dependent on short term design phases.

BRIEF DESCRIPTION OF THE DRAWINGS

The present invention is illustrated by vary examples and not as a limitation in the figures of the accompanying drawings, in which.

DETAILED DESCRIPTION

The following first part of the description illustrates the basic features of the invention by means of simple terms and the accompanying figures. The basic principles and features will thus be illustrated by the system model of a toy train.

The second part to follow will deal with the theoretical background of the invention in more detail. The detailed second part is directed to an example of the invention described as a state event system. It should nevertheless be emphasized that the invention can be utilized in any state based system.

Figure 1:
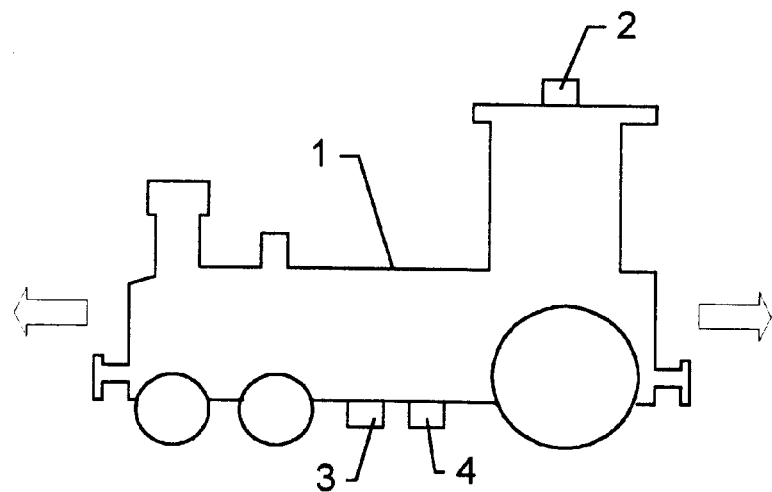
FIGS. 1–4 illustrate the basic machines of an embodiment of the invention.

Referring now to FIG. 1, a small example is described in order to illustrate the key aspects of the technique.

The example consists of a toy train, a gate and a signal. The control of the train will be described as a control system with three parallel state systems. In FIG. 1 a train 1 is shown, featuring three buttons 2, 3, 4 that can be affected from the outside in four different ways. One button 2 is placed on top of the train. If pressed, the system will regard the command as "on top". Two other buttons 3, 4 have been placed under the train. They can be activated individually or as a single unit (the train is inspired by a battery driven DUPLO toy train from LEGO A/S.) When facing in the same direction as the train and pressing the button 3 on the left, the system will regard the command as "left". When in the same position and pressing the button on the right 4, the system will regard the command as "right". If both buttons 3, 4 are pressed simultaneously, this command will be regarded as "both".

Figure 2:
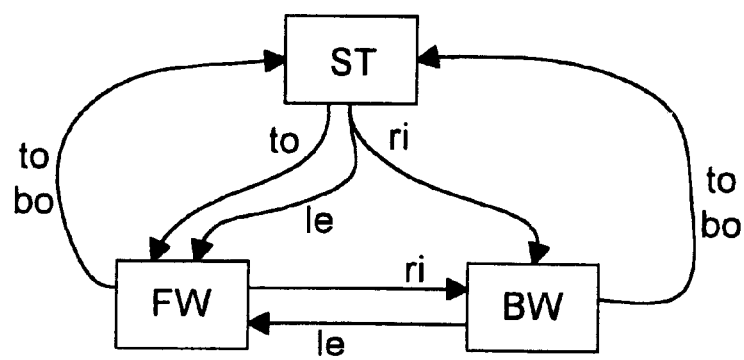

As shown in FIG. 2, the train 1 has, three operating states: Stop, abr. ST; forward, FW; and backwards BW. These states are changeable, as shown by arrows labeled with to, le, ri, ri, le, to bo and to bo. The arrows may be said to represent transitions, and to, le, . . . , etc represent events which may trigger a firing of the connected transition in such a way that the train 1 changes state.

Figure 3:
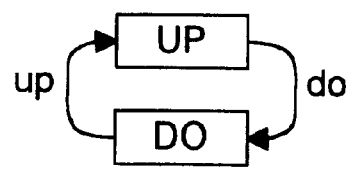

The gate is shown in FIG. 3 , as having two possible positions or states: up, labeled UP or down, labeled DO. These two states can be changed by the command or so-called events "up" or "do".

Figure 4:
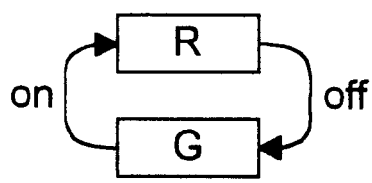

The signal is shown in FIG. 4 as having two states: stop, labeled R or go., labeled G. These two states may be changed by the events "on" and, "off".

All in all, the entire system consists of the train as shown in fig., 2, the gate as shown in FIG. 3 and the signal as shown in FIG. 4 linked together. The three state systems 11, 12 and 13 are made mutually dependent in FIG. 5, as the train can only go from "stop, ST" to "forward, FW" or "backwards, BW" if the gate 12 is down, DO. The corresponding transitions are thus shown as to DO, le(DO) and ri DO, wherein to DO indicates that the transition may fire if the event to, i.e. the top button 2 is activated, happens, under the condition that the gate 12 is in the state DO, down. The reference from the transition in train system 11 to the state DO may be said to be a condition or a guard. Likewise, the signal 13 can only change if the gate is in an acceptable state, "UP" or "DO", respectively.

The present example described above is shown in FIG. 5.

The object of the present analysis is to find out whether a system consisting of a number of state systems can be brought from their initial state to a given (wanted or unwanted) target state.

In the case of the DUPLO System it would, e.g., be interesting to find out if the train could be made to go forward. Such a question may be answered by taking a closer look at the global states of the entire system. For the DUPLO System there is a total of 12 global states consisting of the available combinations of the three local states of the train, the two local states of the gate and the two states of the signal. The "start" state has been set to be (stop, ST; up,UP; red, R) and the question is whether we will be able to change the system to another state such as (FW,?,?) (the "?" indicates that the states of the gate and the signal are irrelevant.)

An analysis of the global states reveals that the answer to the question is YES, demonstrated by the following sequence of global states:

(ST, UP, R)   – do →   (the gate goes down)

(ST, DO, R)   – to →   (the train starts)

(FW, DO, R)

which is a desired target state.

The traditional method used above is, however, not ideal, as it generally requires a construction and a search for the global states that increases exponentially with the number of state systems: if there are 100 systems with two states each, the global state space has $2^{100}$ states.

The method according to the invention is based on a compositional and gradual technique. The technique is compositional because the analysis is based on a limited number of states at the beginning and includes the use of additional machines only when absolutely necessary. These are included after a pre-calculated dependency analysis among the state machines.

In the example of the DUPLO train, it is investigated whether the entire system can be brought in a state enabling the train to move forward. Evidently this ability is dependent on the train and that is the reason why our analysis starts with the train.

Train

Figure 6:
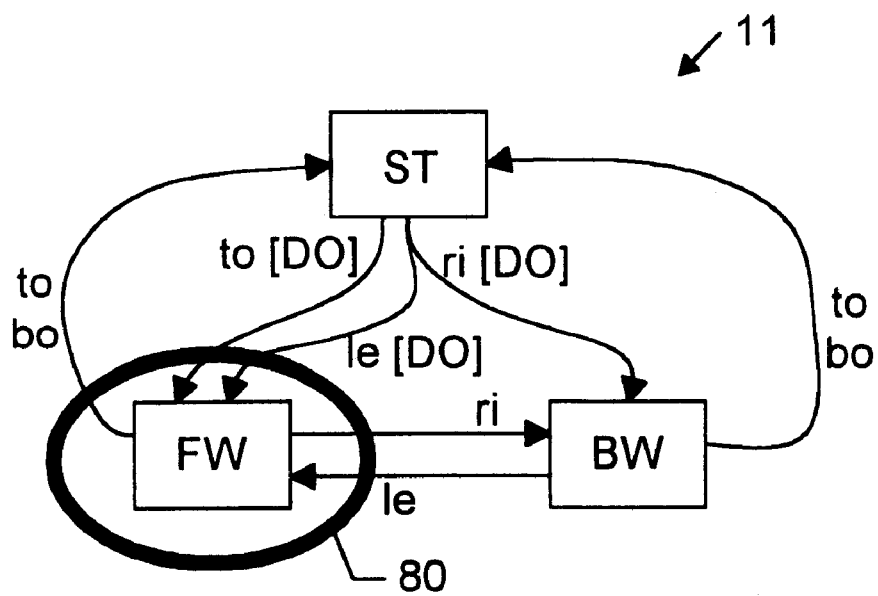

Referring now to FIG. 6, the initial investigated state may be regarded as a goal set 80 which is shown in FIG 6, as (FW; ?; ?).

Figure 7:
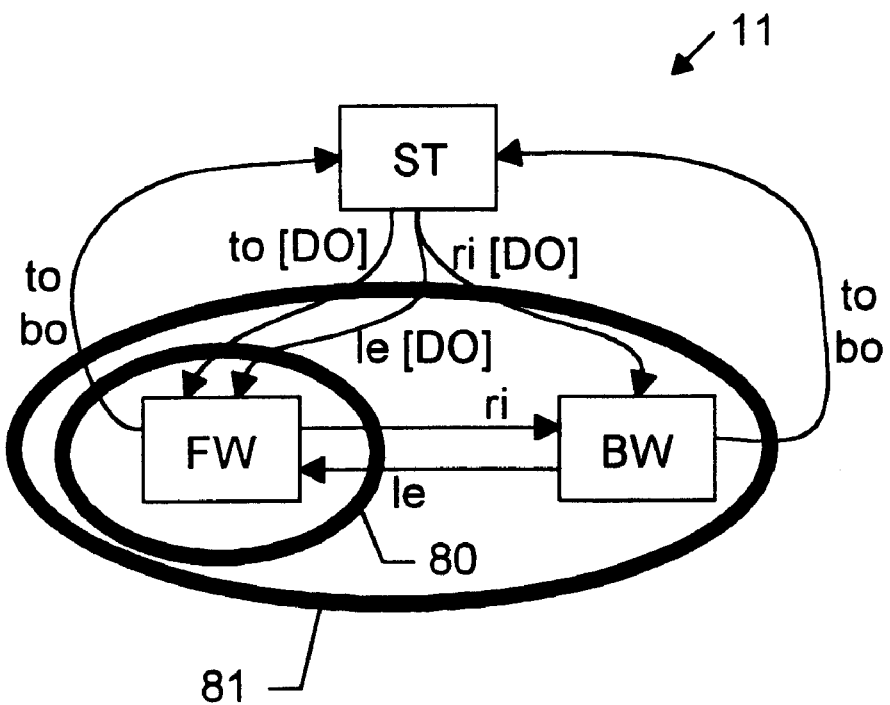

It can moreover be-seen that a change of state from "BW" to "FW" is only conditioned by the state "BW" and neither by the state of the gate nor by the state of the signal. The goal set 80 can thus be expanded to 81 and comprise both BW and FW as shown in FIG. 7.

Figure 8:
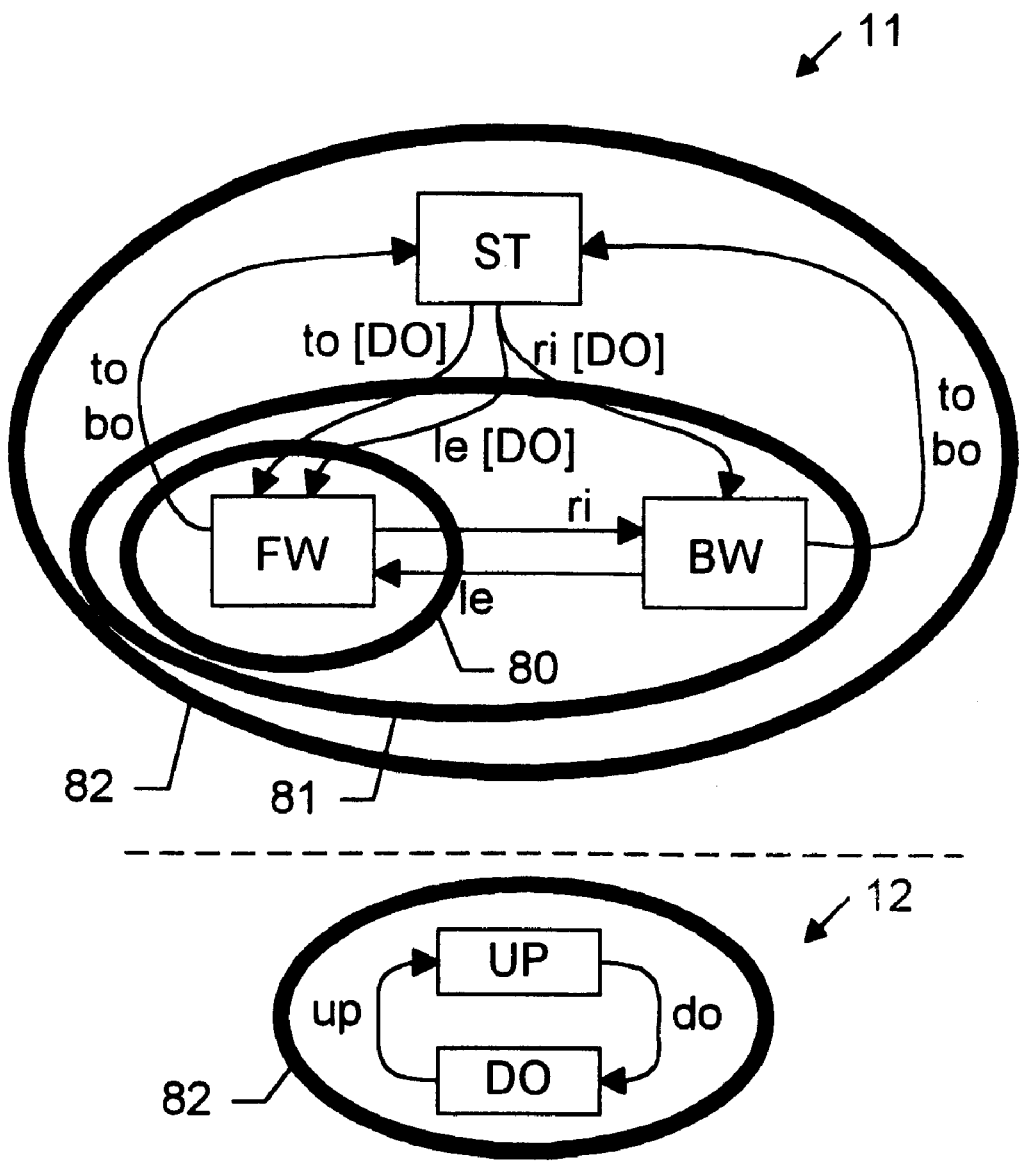

However, still it may not be concluded whether the train can be brought from "ST" to "FW" or "BW". Still, it is observed that the transitions of the train solely depend on the gate 12, the condition "DO", and the analysis is therefore continued after having included the gate 12, as shown in FIG. 8.

Train+Gate

Based on the analysis already carried out, it is sufficient to bring the system in only one of the target states (FW, ?,?) or (BW, ?,?), since the train alone, independently of the gate 12 and the signal 13, will then be able to bring the train in the desired target state. This is of course on the fundamental condition that all events are possible at any given time. It is obvious that the global states of the system (ST, DO, ?)—independently of the signal 13 can be brought into the states (FW, DO, ?) and (RW, DO, ?) and thus in the new target state. This also means that all states available in the system (ST, UP, ?) can be placed in the desired target states as (ST, UP,?)—do→(ST, DO, ?) independently of the signal 13, as indicated in FIG. 8 by the expanded goal set 82.

The initial states are now included in the goal set 82, and FW can be said to be reachable, as the initial state of the global state system (ST, UP, R) is in the goal set and we may therefore conclude, without including the state system of the signal, that the train can be made to go forward.

By means of the simple embodiment of the invention described above, it has thus been shown that a complete analysis, according to a specific question, is a given state in the machine 11 reachable or not, without including all machines 11, 12 and 13, and without a need of calculating all the possible global states.

It should likewise be noted that the signal 13 has not been investigated, even though it has dependencies referring to the gate 12, i.e. on(DO) and off(UP).

It is evident that this compositional approach will be of significant benefit, if a system model comprises a very large number of machines and machine states.

Figure 9:
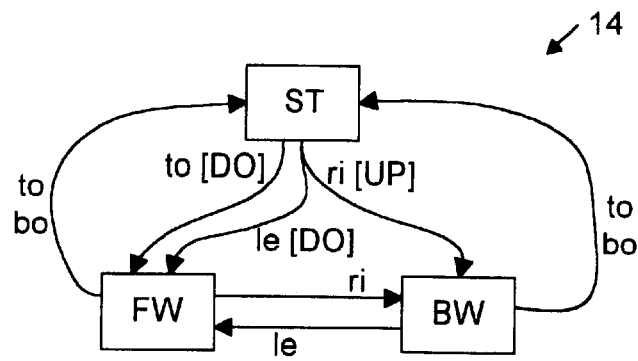
FIGS. 9–10 illustrate a second example of an embodiment of the-invention
Figure 9:
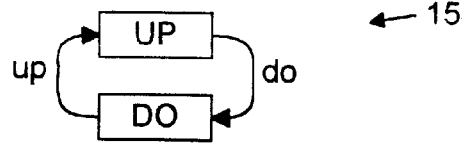
Figure 9:
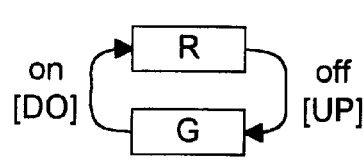

Referring now to FIG. 9, a further example of an embodiment of the invention is described. The system model is basically the same as the system of FIG. 5, but now with modified dependencies or guards on the train 14 and the signal 16.

The variant of the previous DUPLO example thus provides a modified version of the train, as the train 14 now has a transition ri(UP) from ST to BW. It can now be assumed that the change of the states from "ST" to "BW" is for some reason conditioned by the gate 15 being in "UP" state (given by the new condition "UP"). Again, the method of the invention will check whether the system model is capable of making the train move forward, FW from the initial state of the global state system (ST, UP, R).

Like in the aforementioned example, the analysis starts with the train alone, as the target state evidently depends on this component alone.

Train

Figure 10:
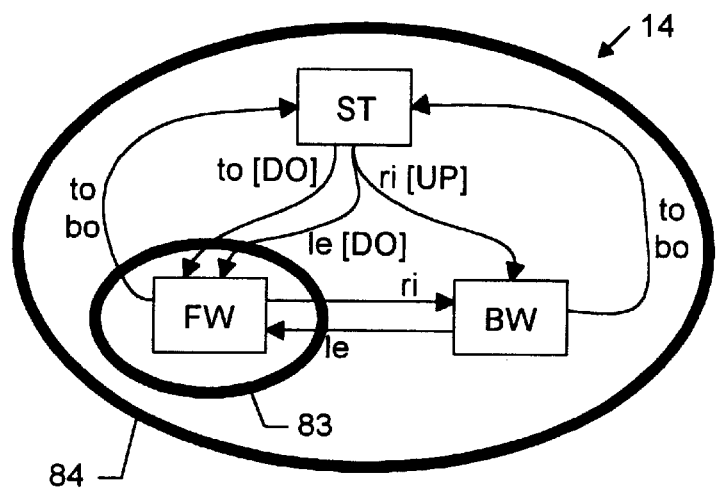

Like before, we see that all states of the system (BW, ?,?)—independently of the gate 15 and the signal 16— can be brought into the global target state (FW, ?,?), i.e. the goal set 83 of FIG. 10 . A change from ST to FW and a change from ST to BW is obviously dependent on the gate 15 as the change to FW from ST is dependent on the gate being down, DO, and as the change from BW from ST is dependent on the gate 15 being up, UP. This leads to a semantic dependency which may always be fulfilled irrespective of the state of the gate 15 as the gate will have to be either in the state UP or DO. Thus, the analysis results in an expansion of the goal set 83 to the goal set 84. This means that in this situation the train can be made to go forward without including the systems of the gate or the signal, as the goal set 84 now includes the desired initial state of the global state system (ST, UP, R).

The expansion of the goal set in the above example has thus been effected by an investigation of the "sum of dependencies" restricting the transitions to the states FW and BW, thus avoiding a need for incorporating the machines 15 and 16.

Figure 5:
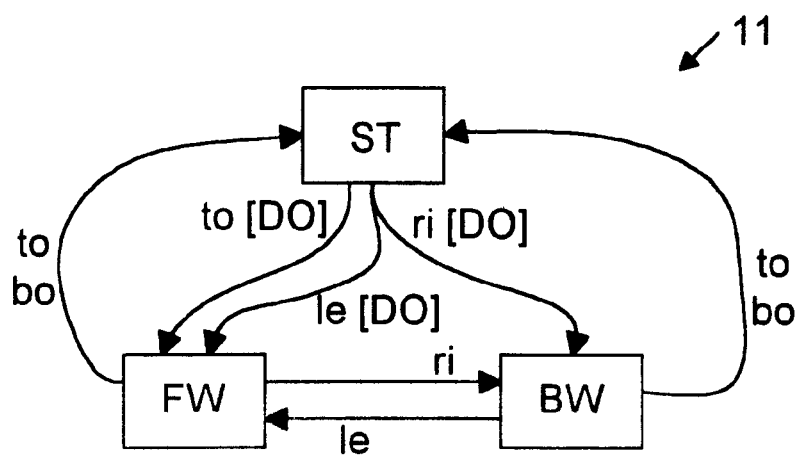
FIG. 5 illustrates the combinations of the machines with the mutual dependencies between the machines of FIGS. 2–4, FIGS. 6–8 illustrate a first example of an embodiment of the invention.
Figure 5:
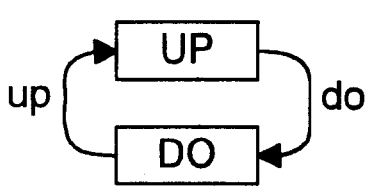
Figure 5:
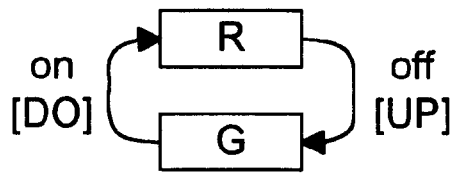
Figure 11:
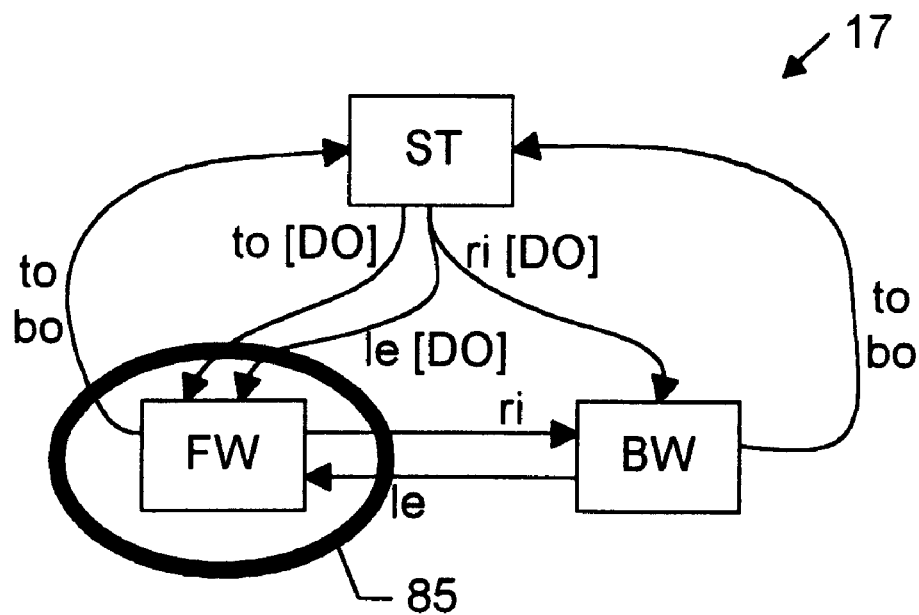
FIGS. 11 and 12 illustrate a third example of an embodiment of the invention
Figure 11:
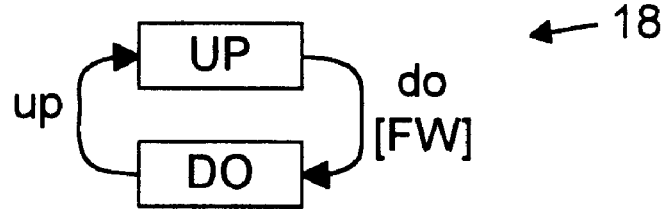
Figure 11:
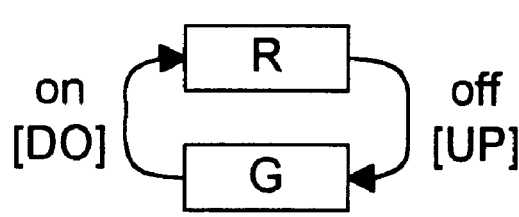

Now turning to a third variant of the original DUPLO System in FIG. 11 in which the model of the train 17 and signal 19 corresponds fully to the described model of the train 11 in FIG. 5. The modification has now been directed to the change of the gate from "UP" to "DO", which is for some reason conditioned by the train being in "FW" state, i.e. the transition do (FW). The target state is still the same: is it possible to make the train move forward, meaning is it possible to reach the global state (FW, ?;?) from the starting state (ST, UP, R)?

As is the case with the first analysis, it is initiated with the train alone with :a goal set 85 comprising FW. Again, it is only immediately possible to conclude that the train can reach the target state from the state (BW, ?,?) if the states of both the-gate 18 and the signal 19 have not yet been examined. In order to be able to conclude whether the train 17 can be brought from a state of "ST" to "FW" or to "BW", we will, once again, have to include the gate 18 in the analysis, as all transitions to FW or BW from ST depend on the gate being in the state DO.

Train+Gate

Figure 12:
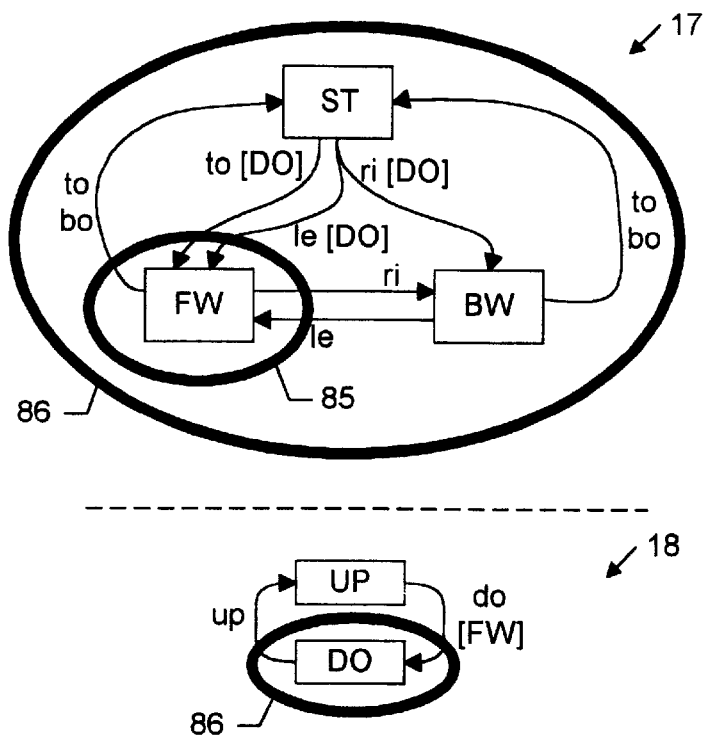

Referring now to FIG. 12, after including the gate 18 and an expansion of the goal set to the goal set 86 it is now obvious that all states of the combination (ST, DO, ?) can be brought into the desired state independently of the signal 19. Meanwhile, the state (ST, UP, ?), representing the starting or initial conditions, cannot be changed to (ST, DO, ?) into the expanded goal set 86, as the conditions of the gate 18, i.e. the transition of do(FW), influencing the train "FW", have clearly not been fulfilled. It is also obvious that taking the signal 19 into account will not solve this problem either directly or indirectly, as none of the states of the train 17 or of the gate 18 depend on the signal. It can thus be concluded, without including the signal, that the target state cannot be reached.

The method illustrated above may briefly be described as follows:

Given: a number of machines systems M1, . . . ,Mk with the starting states s1, . . . ,sk.

Question: Is it possible for the system to reach a given target state.

Method:
1. Let A illustrate the global state system that is evidently capable of reaching the target state.
2. Include the systems directly referred to in the target state (let these be called I).
3. Account for all global states, independently of the systems still not included, which can reach the states in A. These states are called BI* (A).
4. If BI* (A) includes the global starting state, the method stops here with a YES.
5. If the systems in I do not refer to outside systems, the method stops here with a NO.
6. In all other cases, the systems are added to I under the conditions referred to, and target state A is replaced by BI* (A) and the method is repeated from step 3.

Dead-lock

The compositional method can be used for other purposes than for an access investigation. It can be shown that a system model can furthermore be checked for a dead-lock. A global dead-lock in a system is a global state in which the system cannot change machine state, no matter what the command :or action may be. A dead-lock may occur if the system reaches a state where there are no longer any transitions of the machine states. It may also occur if there are actual transitions out of the local machine states simply because these states depend on requirements/conditions that have not been fulfilled.

A more refined term is a local lock in which one or more machines are incapable of changing state independently of how other machines change their states. More precisely, a global state s is a local dead-lock for machine i and, independently of the events to which the system is exposed if will remain in the same state. The concept is illustrated in FIG. 13.

Figure 13:
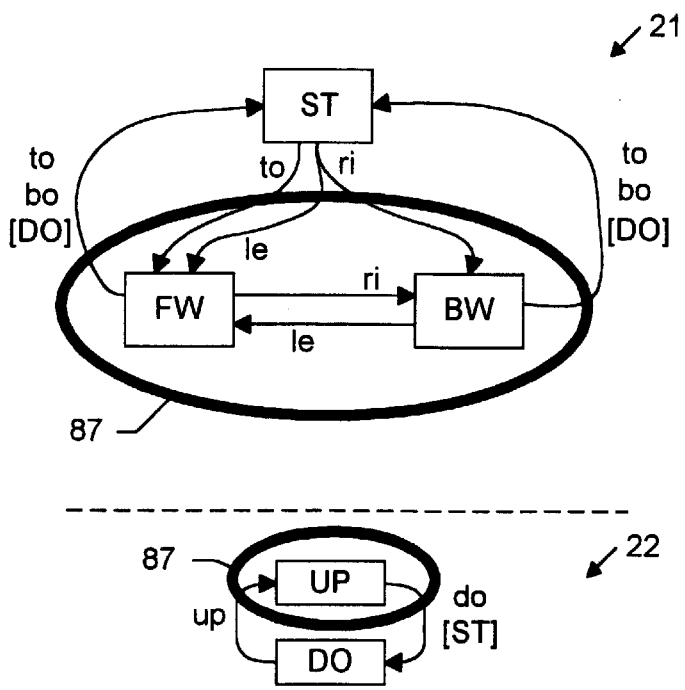
FIG. 13 illustrates a method of detecting a dead-lock in a system model according to an embodiment of the invention.

FIG. 13 shows yet another variation of the train. The train 21 has been connected to a gate 22. The transitions into the state "ST" of the train 21 are, quite staged, dependent on the gate 22 being down, DO. The gate 22 can, also a bit staged, only change from "UP" to "DO" if the train has stopped, i.e. the transition do(ST).

Train, Gate

The global state (FW, UP) is a local dead-lock for the gate 22. Irrespective of the event, the gate 22 will never be able to change its state to "DO". This is due to the fact that the transition from the state "UP" to the state "DO" requires that the train 21 is in the state "ST". Meanwhile, all transitions to the state "ST" rely on the gate being in "DO" state. Naturally, this cannot take place until the train is in "ST" state, and so forth. In other words: The gate 22 has a dead-lock. The train 21 has no dead-lock in this state since the train can change between the state "FW" and "BW" with the commands "ri" and "le". Consequently, the state (BW, UP) is also a local dead-lock for the gate.

In order to take advantage of a test method to locate any local dead-locks. As the method starts by calculating the states in machine i, which are active/alive and therefore not equipped with a dead-lock. More precisely, the global: state s is active/alive for machine i if there is a sequence of global states s1, s2, . . . ,sk with s=s1, which indicates that certain events make the global state sj capable of changing to sj+1 through a transition, while s1 and sk also have different local states. In other words, there is a sequence of state transitions so that machine i will have changed state at one point.

The method explained below will describe how the global states that are active/alive for a machine M1 can be located. These machine states are called Ai. The set of states not in Ai constitute potential locks for Mi. They are only potential locks, because they may not be accessible from the "start" state. Whether this is possible can be determined by using the above method for compositional and-gradual analysis of state systems based on the dependency analysis.

A test method for calculating active/alive states for a machine Mi according to the invention.

Given: a set of state machines M1, . . . ,Mk, and, among these, a chosen machine Mi.

Question: Compute the global states alive/active for machine Mi.

Method:
1. Let A illustrate the-unknown set of global states.
2. Include the first machine i. Then, let I be the symbol for the set of machines investigated, starting with I={i}.
3. Calculate all the global states that, independently of the machines not included at this point, in one or more steps, are capable of making a transition that changes, the state of machine i or changes to a state in A. The result is $A_{Ii}^*(A)$
4. If $A_{Ii}^*(A)$ comprises all global states, the investigation ends here. (This means that all states are active/alive- for machine Mi and do therefore not feature a
5. If that is not the case and on the condition that the machines in I do not refer to machines outside I, the result is $A_{Ii}^*(A)$.
6. If not, I has a number of new machines added to it that are referred to in the conditions/requirements for transitions machines in I, A is assigned equal to $A_{Ii}^*(A)$ and the method is repeated after 3.

To determine whether a machine has a "real" dead-lock, meaning a state that is both a dead-lock and also reachable, the first step is to use the test method mentioned above in order to find, the states Li that are active/alive for machine i. The next step is to find out whether one of the states not included in this set is reachable. When combined, the following method appears.

A method for locating reachable local dead-locks according to the invention.

Given: A set of state machines M1, . . . ,Mk.

Question: Does one of the machines M1, . . . , Mk have a local dead-lock?

Method:
1. By using the method for calculating the set of alive/active states, it is possible to determine a set for each of the machines; Ai. Steps 2, 3, and 4 must be repeated for all machines.

2. Let A be the set of global states that are not in Ai. These are potential dead-locks for the machine Mi.
3. By using the method of determining the reachability of a given target state, it can be determined if access for A is possible from the "start" state. If the answer is YES, the machine has an reachable local lock and the answer YES is given.
4. If not, the answer is NO.

In the example from above, the methods will have the following sequence. First, the gate is checked for a local dead-lock. The machine indexed 2, i.e. the gate, is the only inclusion so far, and that is the reason why, by means of the second method, it may be discovered that $$L_{\{2\},2}*(\emptyset)=\{(?, DO)\}.$$

Now include machine 1 and discover that $$L_{\{1,2\},2}*(\{?, DO)\}=\{(?, DO), (ST, UP)\}.$$

This is the final result of active/alive states for the gate. This means that the number of global states that are not alive/active for the gate are $$\{(FW, UP), (BW, UP)\}.$$

It is now time to find out whether some of these are reachable. They are both reachable from the given starting conditions, and the gate 22 is therefore equipped with a local dead-lock in both states.

The calculations for the train 21 will be different. The first step is to include only the train, and it is discovered that the alive/active states are:

$$L_{\{2\},2}*(\emptyset)=\{(ST, ?), (FW, ?), (BW, ?)\}.$$

This includes all states and the calculations provide the result that the train has no dead-lock.

The set $L_{\{i\},1}*(A)$ is computed, as is the case with BI*(A), by fixed point iterations well known in the art.

The system models described above may be regarded as state/event models which are concurrent versions of Mealy machines, that is, it consists of a fixed number of concurrent finite state machines that have pairs of input events and output actions associated with the transitions of the machines. The model is synchronous: each input event is reacted upon by all machines in lock-step; the total output is the multi-set union of the output actions of the individual machines. Further synchronization between the machines is achieved by associating a guard with the transitions. Guards are Boolean combinations of conditions on the local states of the other machines. In this way the firing of transitions in one machine can be made conditional on the local state of other machines. If a machine has no enabled transition for a particular input event, it simply does not perform any state change.

Referring to FIG. 1 to FIG. 12 it is well known that subsets of a state space can be represented using Reduced Ordered Binary Decision Diagrams (ROBDDs). This is described in R. E. Bryant, "Graph-based algorithms for Boolean function manipulation", IEEE Transactions on Computers, volume 8, number C-35, pages 677–691, 1986.

Efficient operations to test for emptiness and equivalence of such subsets and for performing the set operations of union and intersection are well-known for ROBDDs and described in Bryant, above. Moreover, efficient operations computing the image of a transition relation on a set of states are described in Bryant. A computation of the image of a transition relation requires the transition relation to be represented as a single ROBDD. This is known to give problems sometimes due to a large size of the representation. In these cases the transition relation can be more efficiently represented as a disjunction or conjunction of smaller relations called a partitioned transition relation, as explained in J. R. Burch, E. M. Clarke, and D. E. Long, "Symbolic Model Checking with Partitioned Transition Relations". In Proceedings of 1991 Int. Conf. on VLSI, A. Halaas and P. B. Denyer (eds), August, 1991.

Many state based system models may preferably be designed and described as so-called hierarchical system models.

In the following a preferred transformation of that type of system models will be described, as the invention may preferably be performed on so-called flat state based system models.

Figure 14:
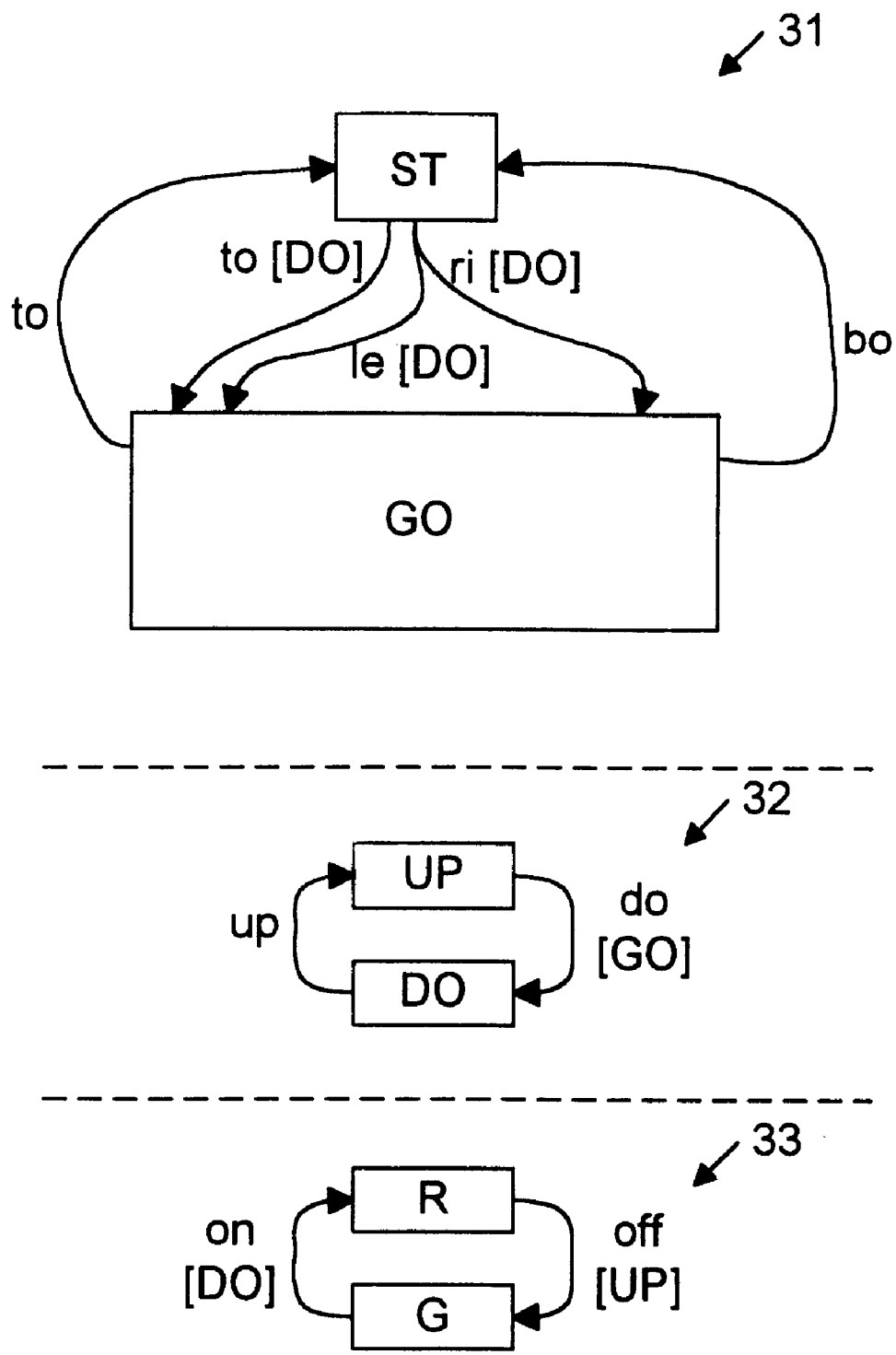
FIGS. 14–20 illustrate how an expanded state system model is obtained via a transformation of a hierarchical system model.

Referring now to FIG. 14, the basic properties of a hierarchical system model is described.

Train, Gate, Signal

In FIG. 14 the two former states "FW" and "BW" have been replaced with the single; new and more abstract state "GO". The control system illustrated in FIG. 14 thus provides a more abstract description of the behavior of the train corresponding to what a slightly near-sighted person who cannot tell the difference between the front and the tear end of the train, would experience.

Figure 15:
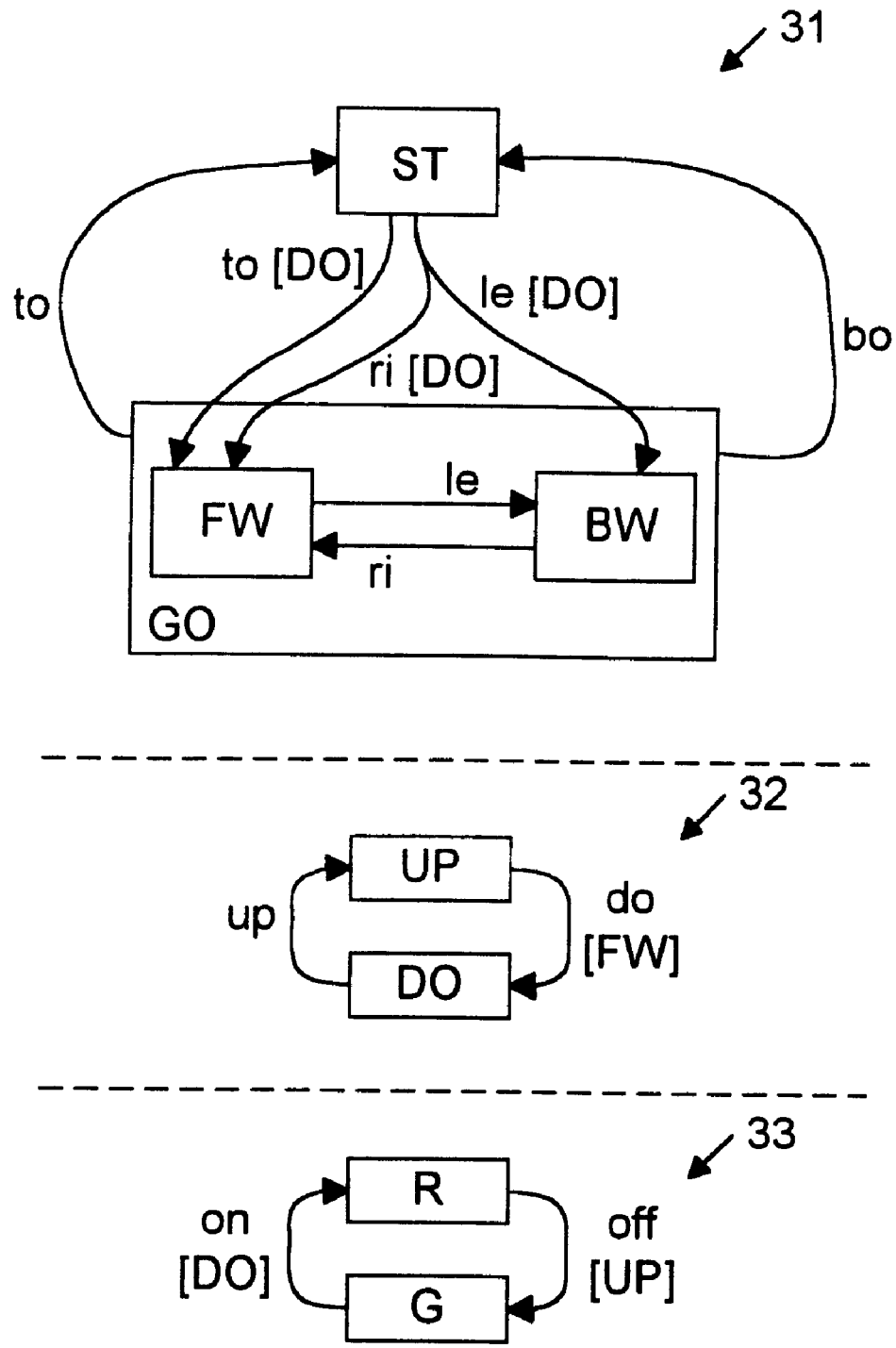

Meanwhile, it is possible to maintain the original description of the train 31 by refining the state "GO" in the form of a state system that contains the exact states of "FW" and "BW". This results in the hierarchical description of the DUPLO train, as illustrated in FIG. 15.

Train, Gate, Signal

Apart from the improvement of the state system with two new states "FW" and "BW", the three original transitions of the state "GO" have also been refined by featuring "FW" and "BW" respectively as result states. Finally, the gate 32 transition from "UP" to "DO" has had its state refined to "FW".

State Systems and Machines

A state system comprising a set of state machines M1, . . . ,Mn. A state machine M comprises a set of states S1, . . . ,Sk, together with a number of transitions Si→Sj.

The abstract version of the DUPLO train is a state system with one single state machine, train 31, in which there are two states: "ST" and "GO" between which there is a total of 5 transitions as shown in FIGS. 14 and 15.

In order not to cause any confusion, it is chosen to call state systems without hierarchy flat state systems.

Hierarchical State Systems and Machines

A hierarchical state system, HSys, comprises a set of hierarchical machines HM1 . . . HMn. A hierarchical state machines HM comprises a number of hierarchical states HS1 . . . , HSk and a number of transitions Hsi→HSj between these.

A hierarchical state HS is either primitive or a hierarchical state system in itself.

The hierarchical version of the DUPLO train is a hierarchical state system with one single, state machine 31 that features two hierarchical states "ST" and "GO" between which there are 5 transitions. The state "ST" is primitive, whereas "GO" in itself is a hierarchical state system with two states "FW" and "BW" between which there are 2 transitions. Both "FW" and "BW" are primitive states.

Hierarchical states and state machines are assigned to a certain level depending on how far they reach into the hierarchy. In the hierarchical version of the DUPLO train, the states "ST" and "GO" are present on both levels, whereas the state "FW" and "BW" are on the second level.

It should be noted that the flat state system constitutes special cases of hierarchical state systems in which all states are either primitive, or, correspondingly, in which all states are on the first level.

Expansion of Hierarchical State Systems

Hierarchical state systems make it possible to give more compact and structured descriptions compared to flat state systems. Any hierarchical state system can, however, also be expanded to a flat state system, according to which the inventive method of compositional and gradual analysis may be brought into use.

Expansion consists of a continuous performance of the expansion process mentioned below, until a flat state system has been generated.

Expansion Process—States

Figure 16:
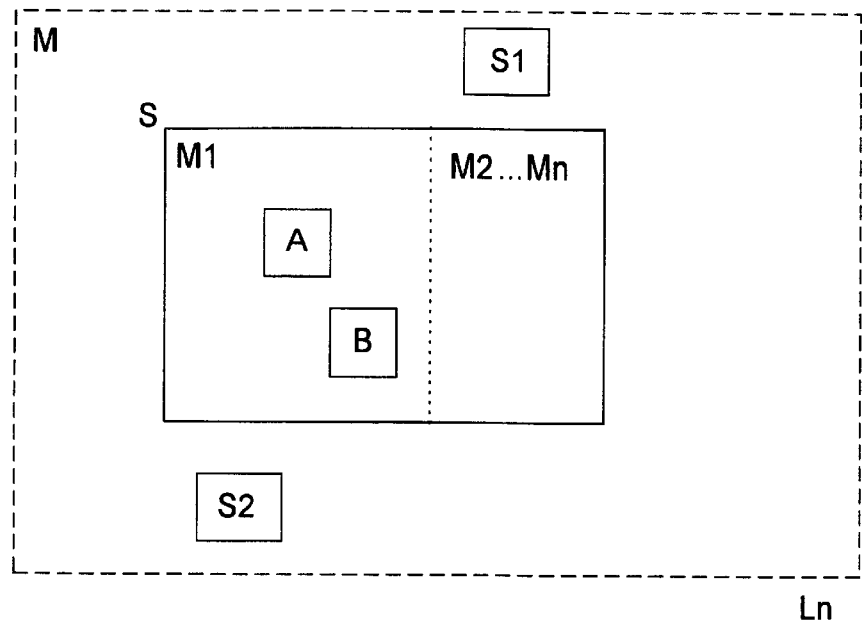

Referring now to FIG. 16, Hsys is initiated to be the actual hierarchical state system at level n (Ln). The expansion process takes its starting point in a hierarchical state S on another level than n, which in itself is another hierarchical state system consisting of a number of hierarchical machines M1, ... ,Mn ,that is on level n+1.

Figure 17:
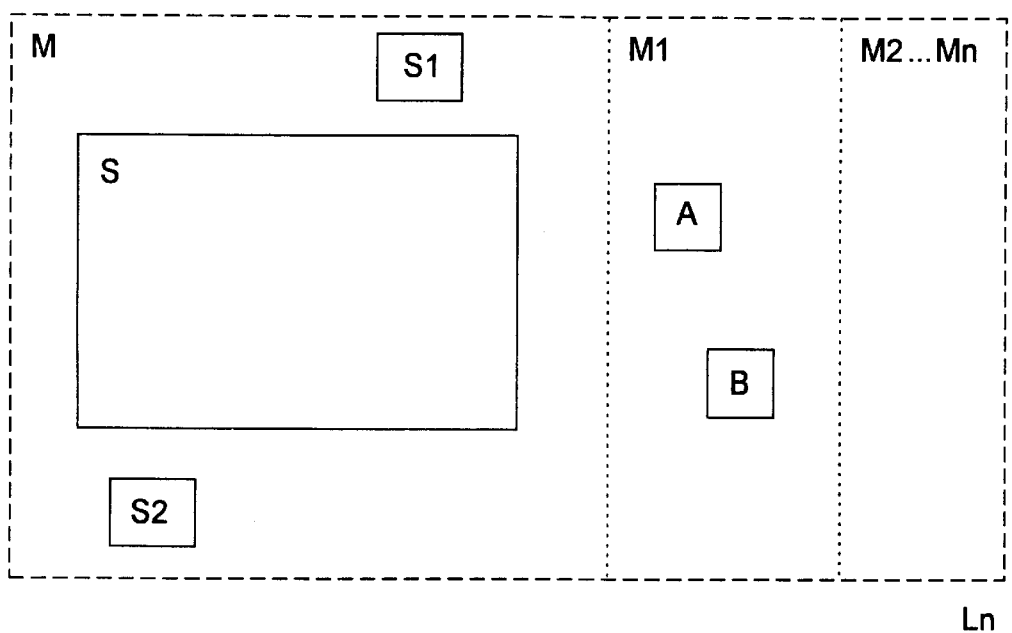

Referring now to FIG. 17, the expansion process consists of changing the status of states S to primitive by bringing the machines M1 ... Mn on level with S. After carrying out the expansion process, the control system shown in FIG. 17 is achieved.

Thus, the expansion process reduces the number of hierarchical states (by 1) and by repeating the reduction step the end result will be a hierarchical state system where all states are primitive, also called a flat state system.

Expansion Process—Transitions

Figure 18:
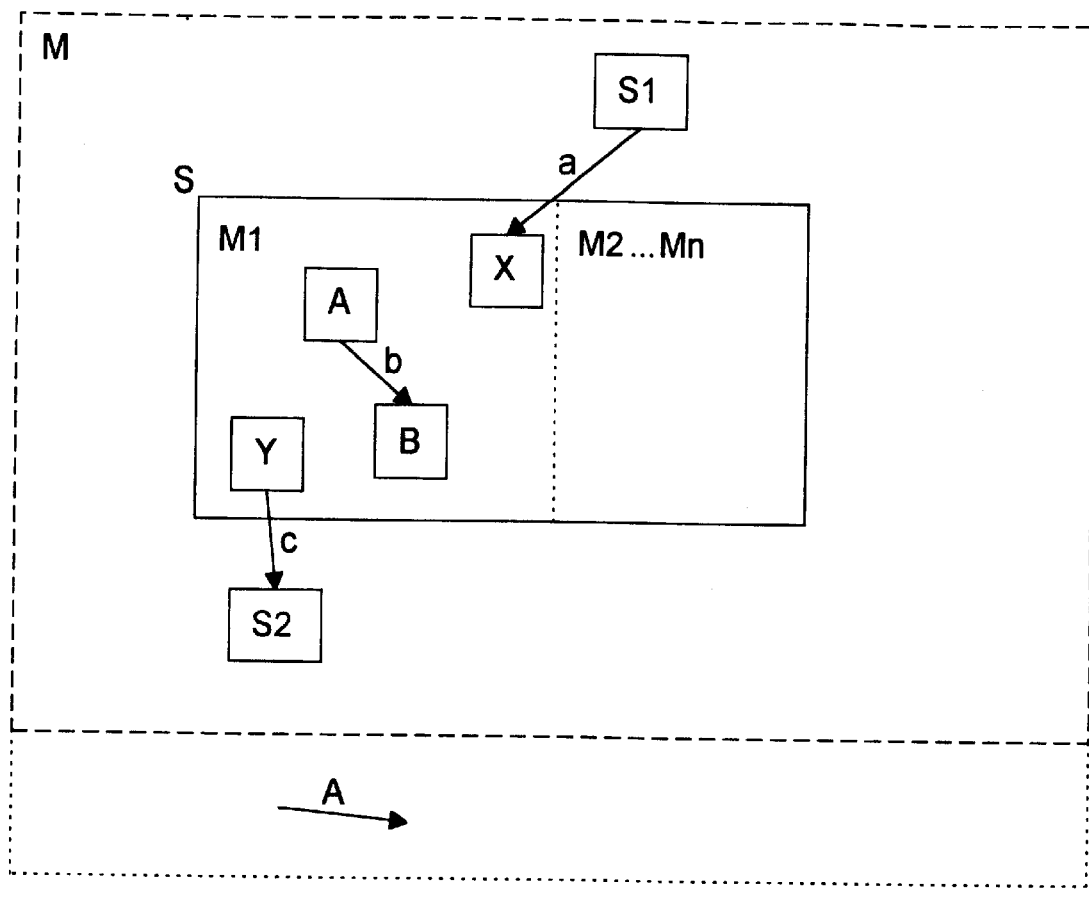

At this point, transitions are included in the expansion process. Generally, transitions are dependent on certain conditions, or guards, which must be satisfied before the transition in question may take place. These conditions may be demands/requirements partly to affect the occurrence of actions in the surroundings in which the entire state system is situated, and partly to affect other ingoing machines of other state systems. During the expansion process these demands/requirements may be modified in different ways in order to ensure that the right relation/connection between the hierarchical state system is present prior to the expansion process and after its execution. Examples of such modifications are given in FIG. 18.

Figure 19:
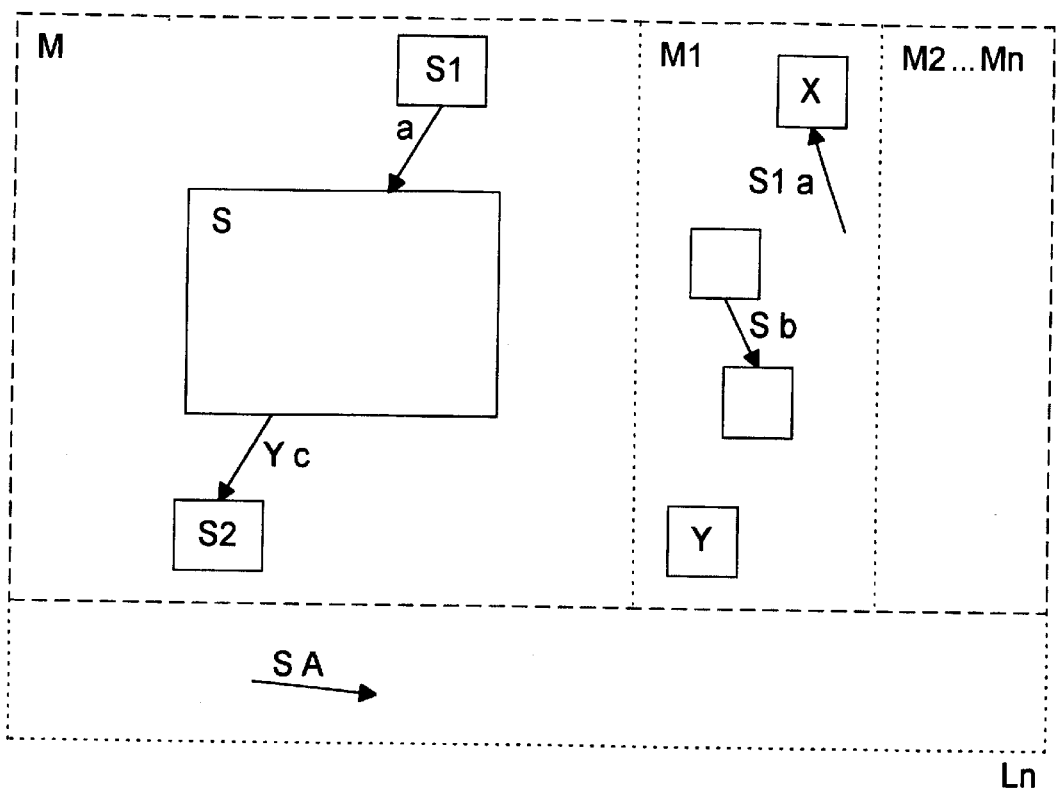

Referring to FIG. 19, the scenario mentioned above is considered and transitions and conditions/requirements are added to these as illustrated. In this case the requirements/conditions are a, b, c and d.

It is evident that the transitions in the machines in S (M1, ... ,Mn), e.g. the transition from A to B, can only take place in so far the control system M is actually in state S (not S1 or S2). In order to ensure that the same applies to the transition from A to B, the condition/requirement b is expanded to b S.

The transition in M from S1 to S has different ways to single out the sub-states in S to be activated; for example, state X could be chosen for the submachine M1. To ensure that state X is also activated when the expansion of S1 to S,is carried out, transitions can be added to X from all the other states in M1 with the limitation of S1 a, which is precisely what is required to make the transition from S1→S.

The transition in M from S to S2 presents conditions/requirements concerning the sub-states in S that must be active if a transition is to be made. For example, one condition/requirement could be that the machine M1 is in state Y. To make sure that the same would apply after the expansion, the condition/requirement c concerning the transition from S to S2 can be expanded to c Y.

In a machine on level with M, there is a transition whose condition/requirement includes state A. After an expansion, it must be ensured that not only is M1 in state A but also that machine M is in state S.

Figure 20:
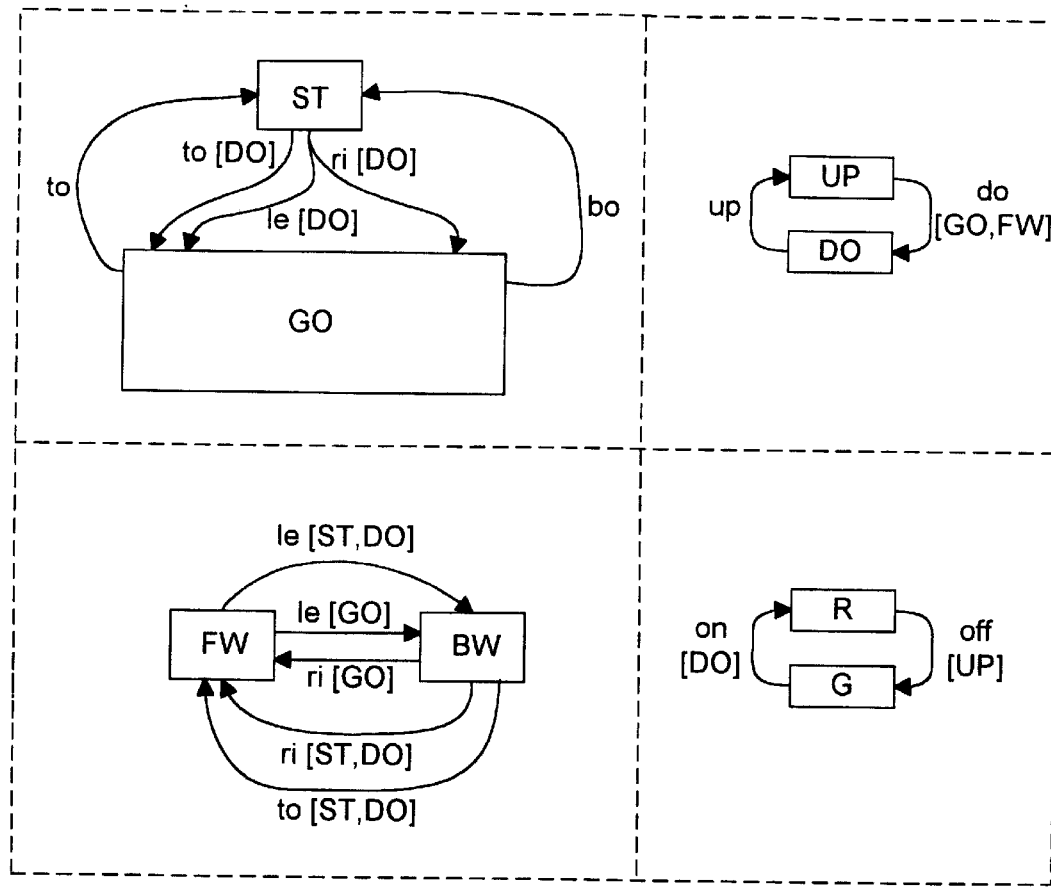

With the given modifications of the conditions/requirements for transitions, the result of a transformation process may be illustrated as shown in FIG. 20.

Expansion of the Hierarchical DUPLO Train

The effect of an expansion will now be shown in the illustration of the DUPLO train in FIG. 20. It should be noted that the three transitions from the states "ST" to "GO" quite explicitly point out which sub-states of "GO" must be activated. The only obvious candidate for the expansion is the state "GO" which is the only non-primitive state. The result of the expansion process is as follows.

Train, Gate, "GO", Signal

Given: A hierarchical control system, Hsys.

Result: An equivalent/similar flat state system, Sys.

Method:
1. Let S be a state on level with n, which is in itself a hierarchical state system consisting of a number of hierarchical machines M1, ... ,Mk.
2. Carry out the expansion of S, which means bringing the machines M1, ... ,Mk on level with S with the necessary transition modifications and requirements.
3. If all states are primitive. STOP
4. If not, repeat the process from 1.

Turning now to a more detailed explanation of the basic characteristics of an embodiment of the invention, some aspects of the invention will be discussed more thoroughly.

A state/event system consists of n machines $M_1, \ldots, M_n$ over an alphabet of input events E and an output alphabet $\mathbf{0}$. Each machine $M_i$ is a triple $(S_i, s^0_i, T_i)$ of local states, an initial state, and a set of transitions. The set of transitions is a relation $$T_i \subseteq S_i \times E \times G_i \times M(O) \times S_i,$$

where M(O) is a multi-set of outputs, and Gi is the set of guards not containing references to machine i. These guards are generated from the following simple grammar for Boolean expressions:

$$g ::= l_j = p \mid \neg g \mid g \hat{} g \mid tt.$$

The atomic predicate $l_j = p$ is read as "machine j is at local state p" and tt denotes a true guard. The global state set of the state/event system is the product of the local state sets: $S = S_1 \times S_2 \times \ldots \times S_n$. The guards are interpreted straightforwardly over S: for any $s \in S$, $s \models l_j = p$ holds exactly when the j'th component of s is p, i.e., $s_j = p$. The notation $g[s_j \; l_j]$ denotes that $s_j$ is substituted for $l_j$ with occurrences of atomic propositions of the form $s_j = p$ replaced by tt or ¬tt depending on whether $s_j$ is identical to p.

Considering a global state s, all guards in the transition relation can be evaluated. We define a version of the transition relation in which the guards have been evaluated. This relation is denoted $$s \xrightarrow{e \; o}_i s'_i$$

expressing that machine i when receiving input event e makes a transition from $s_i$ to $s'_i$ and generates output o. Formally, $$s \xrightarrow{e\;o}_i s'_i \Leftrightarrow_{def} \exists\, g(s_i, e, g, o, s'_i) \in T_i \text{ and } s \models g.$$

Two machines can be combined into one. More generally if $M_I$ and $M_J$ are compositions of two disjoint sets of machines I and J, $I, J \subseteq \{1 \ldots, n\}$, we can combine them into one $M_{IJ} = M_I \times M_J = (S_{IJ}, (S^o{}_{IJ}), T_{IJ})$ where $S_{IJ} = S_I \times S_J$ and $S^o{}_{IJ} = (S^o{}_I, S^o{}_J)$. The transition relation $T_{IJ}$ is a subset of $S_{IJ} \times E \times G_{IJ} \times M(O) \times S_{IJ}$, where $G_{IJ}$ are the guards in the composite machine. By construction of $T_{IJ}$, the guards $G_{IJ}$ will not contain any references to machines in $I \cup J$. To define $T_{IJ}$ we introduce the predicate idle:

$$\text{idle}(T_I, s_I, e) = \hat{}\{\neg g \mid \exists o, s'_I (s_I, e, g, o, s'_I) \epsilon T_I\}$$

which holds for states in which no transitions in $M_I$ are enabled at state $s_I$ when receiving the input event e. The transition relation $T_{IJ}$ is defined by the following inference rules (the symbol+denotes multi-set union):

$$\frac{(s_I, e, g_1, O_1, s'_I) \in T_I (s_J, e, g_2, O_2, s'_J) \in T_J}{((s_I, s_J), e, g, O_1 + O_2, (s'_I, s'_J)) \in T_{IJ}} \quad g = g_1[s_J/l_J] \wedge g_2[s_I/l_I]$$

$$\frac{(s_I, e, g_1, O_1, s'_I) \in T_I}{((s_I, s_J), e, g, O_1, (s'_I, s'_J)) \in T_{IJ}} \quad g = g_1[s_J/l_J] \wedge idle(T_J, s_J, e)[s_I/l_I]$$

$$\frac{(s_J, e, g_2, O_2, s'_J) \in T_J}{((s_I, s_J), e, g, O_2, (s'_I, s'_J)) \in T_{IJ}} \quad g = idle(T_I, s_I, e)[s_J/l_J] \wedge g_2[s_I/l_I]$$

The rules show the synchronous behaviour of state/event systems. The first rule represents the case where an enabled transition exists an with input event e in both $T_I$ and $T_J$ and the resulting transition in $T_{IJ}$ represents the synchronization on e. The other two cases occur if no enabled transition exists in either $T_I$ or $T_J$.

Figure 21:
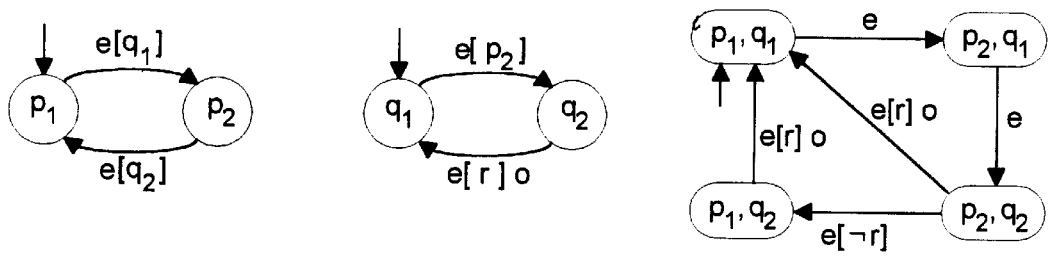
FIGS. 21–24 illustrate the basic mathematical properties of the invention.

FIG. 21 shows two state/event machines and the corresponding parallel combination. The guards, which should formally be of the form, $l_j = p$, are simply written as the state [p] since the location $l_j$ is derivable from the name of the state. The small arrows indicate the initial states. The reference to r is a requirement to at state in a third machine not shown.

The full combination of all n machines yields a Mealy machine in which the transitions $$s \xrightarrow{e\;o} s'$$

are defined by $$s \xrightarrow{e\;o} s' \Leftrightarrow \exists\, g(s, e, g, o, s') \in \sum_{i=1}^{n} T_i \text{ and } g \text{ is true}$$

Consistency Checks

A consistency check according to the invention may be a reachability property. For instance a check for "conflicting transitions" may be performed, i.e. a check whether two or more transitions can be enabled in the same local state, leading to non-determinism. This can be reduced to questions of reachability by considering all pairs of guards $g_1$ and $g_2$ of transitions with the same local state $s_i$ and input event e. A conflict can occur if a global state is reachable in which $(l_j = s_1) \,\hat{}\, g_1 \,\hat{}\, g_2$ is satisfied.

This check may be reduced to reachability checks. Other Checks, such as check for transitions that are never enabled and check for states that are never reached, generate a number of reachability checks which is linear in the number of transitions, t. At worst the check for conflicting transitions gives rise to a number of reachability checks which is quadratic in the number of transitions. However, in practice very few transitions have the same starting local state and input event, thus in practice the number of checks generated is much smaller than t.

Other types of consistency checks reduce to a check for absence of local deadlocks. A local deadlock occurs if the system can reach a state in which one of the machines idles forever on all input events. This check is made for each of the n machines. In total at least t+n checks have to be performed making the verification of state/event systems quite different from traditional model checking where typically only a few key properties are verified.

The method according to the invention attempts to reduce the number of reachability checks by performing an implicational analysis between the guards of the checks. If a guard $g_1$ implies another guard $g_2$, then clearly, if $g_1$ is teachable, so is $g_2$. To use this information all the guards are sorted in ascending order of the size of their satisfying state space is initiated. In this way the most specific guards are checked first, and for each new guard to be checked it is compared to all the already checked (and reachable) guards. If the new guard includes one of them, it is determined that it is satisfiable. Through experiments, between 40% and 94% of the reachability checks according to prior art tools are eliminated in this manner.

ROBDD Representation

This section describes how Reduced Ordered Binary Decision Diagrams are used to represent sets of states and the transition relation.

To construct the ROBDD $\tilde{T}$ for the transition relation T, we first construct the local transition relations $\tilde{T}_i$ or each machine $M_i$. The variables of the ROBDD represent an encoding of the input events, the current states, and the next states. The variables are ordered as follows: The first $\|E\|$ variables encode the input events $E(\|E\|$ denote $\lceil \log_2 |X| \rceil$) and are denoted $V_E$. Then follows $2\|S_i\|$ variables $$V_{i,1}, V'_{i,1}, \ldots, V_{i,\|s_i\|}, V'_{i\|s_i\|}$$

encoding the current (unprimed variables) and the next states (primed variables) for machine i.

The transition relation $\tilde{T}_i$ for machine i is constructed as an ROBDD predicate over these variables. The ROBDD for a transition $(s_i, e, g, o_1, s'_i) \epsilon T_i$ is constructed as the conjunction of the ROBDD encodings of $s_i$, e, g and $s'_i$. (The outputs are not encoded as they have no influence on the reachable states of the system.) The encoding of $s_i$, e and $s'_i$, is straightforward, and the encoding of the guard g is done by converting all atomic predicates $l_j = p$ to ROBDD predicates over the current state variables for machine $M_j$ and then performing the Boolean operations of the guard. The encoding of all transitions of machine i is obtained from the disjunction of the encoding of the individual transitions:

$$\tilde{T}_i = \bigvee_{(s_i,e,g,o,s'_i) \in T_i} \tilde{s}_i \wedge \tilde{e} \wedge \tilde{g} \wedge \tilde{s}'_i,$$

where $\tilde{e}$ is the ROBDD encoding of input event e and $\tilde{s}_i$, $\tilde{s}'_i$ are the ROBDD encodings of the current state $s_i$ and next state $s'_i$, respectively.

To properly encode the global transition relation T, we need to deal with situations where no transitions of $T_i$ are enabled. In those cases we want the machine i to stay in its current state. We construct an ROBDD $neg_i$ representing that no transition is enabled by negating all guards in machine i (including the input events)

$$neg_i = \bigvee_{(s_i,e,g,o,s'_i) \in T_i} \neg (\tilde{s}_i \wedge \tilde{g} \wedge \tilde{e})$$

The ROBDD $equ_i$ encodes that machine i does not change state by requiring that the next state is identical to the current state:

$$equ_i = \bigwedge_{j=1}^{\|s_i\|} V_{i,j} \leftrightarrow V'_{i,j}$$

The local transition relation for machine i is then:

$$\tilde{T}_i = \tilde{T}_i (neg_i \hat{} equ_i)$$

The ROBDD $\tilde{T}$ for the full transition relation is the conjunction of the local transition relations:

$$\tilde{T} = \bigwedge_{i=1}^{n} \tilde{T}_i$$

Compositional Backwards Reachability

The problems of prior art iterations can typically be solved by using a backward reachability analysis. The verification task is to determine whether a guard g can be satisfied. Instead of computing the reachable state space and check that g is valid somewhere in this set, we start with the set of states in which g is valid and compute, in a backward iteration, states that can reach a state in which g is satisfied. The goal is to determine whether the initial state is among these states. Our novel idea is to perform the backward iteration in a compositional manner, considering only a minimal number of machines. Initially, only machines mentioned in g will be taken into account. Later also machines on which these depend will be included.

Notice that compared to the forward iteration, this approach has an apparent drawback when performing a large number of reachability checks: instead of just one fixed-point iteration to construct the reachable state space R (and then trivially verify the properties), a new fixed-point iteration is necessary for each property that is checked. However, experiments clearly demonstrate that when using a compositional backward iteration, each of the fixed-point iterations can be completed even for very large models whereas the forward iteration fails to complete the construction of R for even medium sized models.

To formalize the backward compositional technique, a semantic version of the concept of dependency is needed. For a subset of the machines $I \subseteq \{1, \ldots, n\}$, two states s, s'∈S are I-equivalent, written $s =_I s'$, if for all i∈I, $s_i = s'_i$, (the primes are here used to denote another state and are not related to the next states). If a subset P of the global states S is only constrained by components in some index set I, P may be regarded as having I as a sort. This leads to the following definition: a subset P of S is I-sorted, if for all s, s'∈S, $$s \in P \text{ and } s =_I s' \rightarrow s' \in P$$

Figure 22:
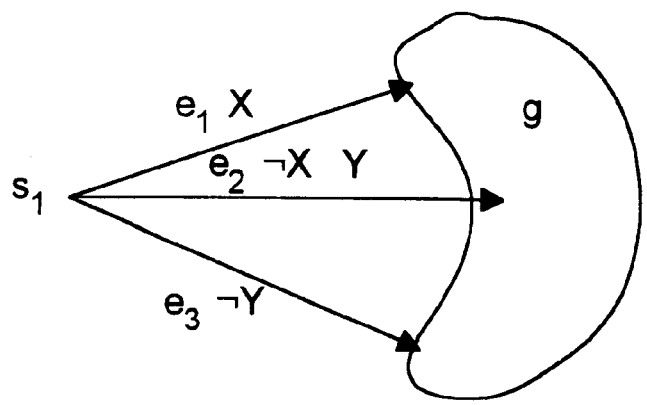

In FIG. 22 the figure is an example showing the effect of $B_I(g)$. If X is the guard $l_j = p$ and Y the guard $l_k = q$ with j, k ∉ I then the transitions from $s_l$ seem to depend on machines $M_j$ and $M_k$ outside, I. However, the guards X, ¬X Y, and ¬Y together span all possibilities, and therefore, by selecting either $e_1$, $e_2$, or $e_3$, the state $s_l$ can reach g irrespective of the states of the machines $M_j$ and $M_k$.

Figure 23:
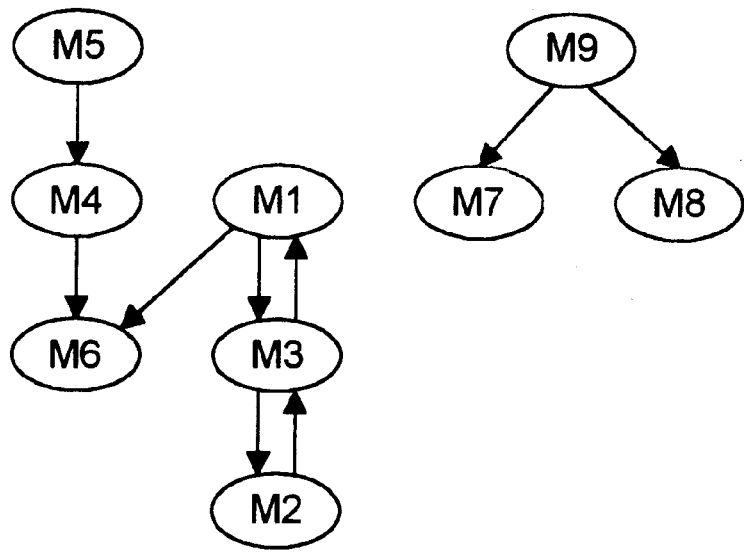

FIG. 23 illustrates the dependencies between 9 state machines taken from a real example. An arrow from one machine $M_i$ to another $M_j$ indicates the existence of a transition in $M_i$ with a guard that depends on a state in machine $M_j$.

As an example, consider a guards which mentions only machines 1 and 3. The set of states defined by g is I-sorted for any I containing 1 and 3. Another understanding of the definition is that a set P is I-sorted if it is independent of the machines in the complement $$\bar{I} = \{1, \ldots n\} \setminus I$$

From an I-sorted set g we perform a backward reachability computation by including states which, irrespective of the states of the machines in $\bar{I}$, can reach g. One backward step is given by the function $B_I(g)$ defined by:

$$B_I(g) = \{s \in S \mid \forall s' \in S, s =_I s' \Rightarrow \exists e, o, s'' \; s' \xrightarrow{e\,o} s'' \text{ and } s'' \in g\} \quad (1)$$

By definition $B_I(g)$ is I-sorted. The set $B_I(g)$ is the set of states which, can reach a state Ln g independently of machines in $\bar{I}$, by some input event e. Observe that $B_I(g)$ is monotonic in both g and I. FIG. 22 shows how a state $s_l$ of a machine is included in $B_I(g)$, although it syntactically seems to depend on machines outside I.

By iterating the application of $B_I$, the minimum set of states containing g and closed under application of $B_I$ can now be computed. This is the minimum fixed-point $\mu X. g \cup B_I(X)$, which we refer to as $B_I^*(g)$. Note that $B^*_{(1, \ldots, n)}(g)$ becomes the desired set of states which can reach g.

A set of indices I is said to be dependency closed if none of the machines in I depend on machines outside I. Formally, I is dependency closed if for all i∈I, states s', s, $s_i$, input events e, and outputs o, $$s \xrightarrow{e\,o}_i s_i$$

and $s' =_I s$ implies $$s' \xrightarrow{e\,o}_i s_i$$

The basic properties of the sets $B_I^*(g)$ are captured by the following lemma:

Lemma 1 (Compositional Reachability Lemma). Assume g is an I-sorted subset of S. For all subsets of machines I, J with $I \subseteq J$ the following applies:

(i) $B_I^*(g) \subseteq B_J^*(g)$ (ii) $B^*_J(g)=B^*_J(B^*_J(g))$ (iii) $I$ dependency closed $\rightarrow B^*_I(g)=B^*_J(g)$ The results of the lemma are applied in the following manner. To check whether a guard g is reachable, the set of machines $I_1$ syntactically mentioned in g, is first considered. Clearly, g is $I_1$-sorted. Then $B^*_{I_1}(g)$ is computed. If the initial state $s^0$ belongs to $B^*_{I_1}(g)$, then by (i) $s^0 \in B^*_{(1\ldots n)}(g)$ and therefore g is reachable from so and we are done. If not, we extend $I_1$ to a larger set of machines $I_2$ by adding machines that are syntactically mentioned on guards in transitions of machines in $I_1$. Then $B^*_{I_1}(g)$ is reused to compute $B^*_{I_2}(g)$ as $B^*_{I_2}(B^*_{I_1}(g))$ which is correct by (ii). This is continued until $s^0$ has been found in one of the sets or an index set $I_k$ is dependency closed. In the latter case (iii) $B^*_{I_k}(g)=B^*_{(1\ldots n)}(g)$ and g is unreachable unless $s \in B^*_{I_k}(g)$.

As an example, assume that it should be determined whether the guard $g=(l_1=p \hat{\ } l_3 \neq q)$ is reachable in the example of FIG. 22. The initial index set is $I_1=\{1,3\}$. If this is not enough to show g reachable, the second index set $I_2=\{1,3,7,2\}$ is used. Since this set is dependency closed, g is reachable if and only if the initial state belongs to $B^*_{I_2}(B^*_{I_1}(g))$.

The above construction is based on a backward iteration. A dual version of $B_I$ for a forward iteration could be defined. However, such a definition would not make use of the dependency information since $s^0$ is only I-sorted for $I=\{1, \ldots n\}$. Therefore all machines would be considered in the first fixed-point iteration reducing it to complete forwards iteration mentioned in prior art method.

Seemingly, the definition of $B_I(g)$ requires knowledge of the global transition relation and therefore does not seem to yield any computational advantage. However, as explained below, using ROBDDs this can be avoided, leading to an efficient computation of $B_I(g)$. The ROBDD $\tilde{B}_I(g)$ representing one iteration backwards from the states represented by the ROBDD $\tilde{g}$ can be constructed immediately from the definition (1):

$$\tilde{B}_I(\tilde{g})=\forall V_{I} \exists V'_{I} \tilde{T}' \tilde{g}[V'/V] \quad (2)$$

where $\tilde{g}[V'/V]$ is equal to $\tilde{g}$ with all variables in V replaced by their primed versions. It is essential to avoid building the global transition relation $\tilde{T}$. This is done by writing $\exists V'$ as $\exists V'_I \exists V'_{\bar{I}}$ and $\tilde{T}=\tilde{T}_I \hat{\ } \tilde{T}_{\bar{I}}$ where $\tilde{T}_I= \hat{\ }_{i \in I} \tilde{T}_i$. This allows us to push the existential quantification of $V'_{\bar{I}}$ to $\tilde{T}_{\bar{I}}$, since g is I-sorted and thus independent of the variables in $V'_{\bar{I}}$. As $\exists V'_{\bar{I}} \tilde{T}_{\bar{I}}$ is a tautology, equation (2) reduces to:

$$\tilde{B}_I(g)=\forall V_{\bar{I}} \exists V_E, V'_I \tilde{T}_I \hat{\ } \tilde{g}[V'/V]$$

which only uses the local transition relations for machines in I. Each $T_i$ refers only to primed variables in $V'_i$, allowing early variable quantification for each machine individually:

$$\tilde{B}_I(\tilde{g})=\forall V_{\bar{I}} \exists V_E \cdot \exists V'_1 \tilde{T}_1^* \exists V'_2 \tilde{T}_2^{\hat{\ }} \ldots \hat{\ }(\exists V'_k \tilde{T}_k \hat{\ } \tilde{g}[V'/V]) \ldots)$$

This equation efficiently computes one step in the fixed-point iteration, constructing $\tilde{B}_I^*(\tilde{g})$.

Notice, that the existential quantifications can be performed in any order. We have chosen the order, in which the machines occur in the input, but other orders may exist, which improves performance.

Local Deadlock Detection

In checking for local deadlocks a construction similar to backward reachability is used. To make the compositional backward lemma applicable the notion of a machine being live which is the exact dual of having a local deadlock is used. In other words, a machine is live if it is always the case that there exists a way to make the machine move to a new local state. Formally, a global state s is live for machine i if there exists a sequence of states $s^1, s^2, \ldots s^k$ with $s=s^1$ and $$s^j \xrightarrow{e\ o}_i s^{j+1}$$

for (for some e and o) such that $s^k_i \neq s^1_i$. Machine i is live if all reachable states are live. A simple example of a state/event system with a local deadlock is shown in FIG. 24.

Figure 24:
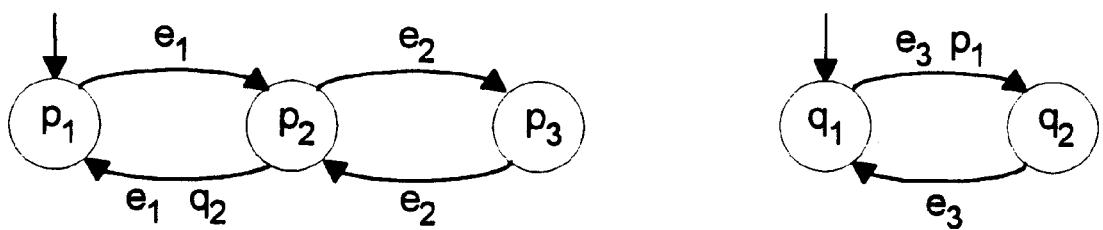

FIG. 24 shows a state/event system with a local deadlock. The global state $S=(p_2, q_1)$ is not live for the machine to the right since for all input events the guard $p_1$ remains false. The state s is reachable (e.g. by initially receiving $e_1$), and thus the machine to the right has a local deadlock.

The check is divided into two parts. First, the set of all live states $L^*_i$ for machine i is computed. Second, we check that all reachable states are in $L^*_i$. A straightforward but inefficient approach would be to compute the two sets and check for inclusion. However, the advantage of the compositional construction according to the invention is used in the backward reachability in both parts of the check.

Similar to the definition of $B_1(g)$, $L_{1,i}(X)$ is defined to be the set of states that are immediately live for machine $i \in I$ independently of the machines outside I or which leads to states in X (which are states assumed to be live for machine i):

$$L_{I,i}(X) = \{s \in S \mid \forall s's =_I s' \Rightarrow \exists e, o, s'', s' \xrightarrow{e\ o}_i s''  \quad (3)$$
$$\text{and } (s_i \neq s''_i \text{ or } s'' \in X)\}$$

Notice that compared to definition (1) the only difference is the extra possibility that the state is immediately live, i.e., $s_i \neq s''_i$. The set of states that are live for machine i independently of machines outside I is then the set $L^*_{I,i}(\emptyset)$, where $L^*_{I,i}(Y)$ is the minimum fixed point defined by $L^*_{I,i}(Y)= \mu X.Y \cup L_{I,i}(X)$.

The three properties of lemma 1 also holds for $L_{I,i}(Y)$ when Y is I-sorted. If I is dependency closed, it follows from property (iii) of the lemma that $L^*_{I,i}(\emptyset)$ equals $L^*_{(I,\ldots,n),i}(\emptyset)$ which is precisely the set of live states of machine i. This gives an efficient way to compute the sets $L^*_{I,i}(\emptyset)$ for different choices of I. Starting with $I_1$ equal to $\{i\}$ and continuing with larger $I_k$'s exactly as for the backward reachability. The only difference is the termination conditions. One possible termination case is if $L^*_{I_k,i}(\emptyset)$ is equal to S for some k. In that case it is trivial that the set of reachable states is contained in $L^*_{I_k,i}(\emptyset)$, from the monotonicity property (i) of the lemma. It follows that machine i is live and thus free of local deadlocks. The other termination case is when $I_k$ is dependency closed. Then we have to check whether there exists reachable states not in $L^*_{I_k,i}(\emptyset)$. This is done by a compositional backward reachability check with $g=S \backslash L^*_{I_k,i}(\emptyset)$.

Proof of lemma 1

It is first observed directly from the definition that $B_I(g)$ is monotonic in both I and g, i.e. for any J with $I \subseteq J$ and g' with $g \subseteq g'$:

$$B_I(g) \subseteq B_J(g) \quad (1)$$

$$B_I(g) \subseteq B_I(g') \quad (2)$$

The operation of taking minimum fixed points is also monotonic, therefore for any I and J with $I \subseteq J$ we have from (1):

$$B^*_I(g) = \mu X\ g \cup B_I(X) \subseteq \mu X\ g \cup B_J(X) = B^*_J(g)$$

proving that $B^*_I$ (g) is monotonic in the index set of machines I, which is (i) of the lemma.

To prove (ii) of the lemma first observe from the definition of $B^*_J(g)$ that $g \subseteq B^*_J(g)$, hence by monotonicity $B^*_J(\_)$ and $B^*_J(g)$ it follows that $$B^*_J(g) \subseteq B^*_J(B^*_J(g)) \subseteq B^*_J(B^*_J(g)) = B^*_J(g)$$

The last equality follows from the fact that $B^*_J$ (g) is fixed-point. We have proven (ii) of the lemma.

To prove (iii) it is first observed that the inclusion $\subseteq$ holds by (i). Thus concentrating on the other inclusion $\subseteq$, the following fixed point induction principle is employed (due to David Park):

$$F(X) \subseteq X \text{ implies } \mu Y.F(Y) \subseteq X$$

Recalling that a set X for which $F(X) \subseteq X$ is called a pre-fixed point of X, we can phrase this as: "$\mu Y F(Y)$ is the minimum pre-fixed point of F, therefore if X is some other prefixed point of F, then it must include the minimum one". We must therefore just argue that $$g \cup B_J(B^*_I(g)) \subseteq B^*_I(g)$$

in order to have proven (iii). A further simplification is obtained by observing that by definition $g \subseteq B^*_I(g)$, and we therefore only need to prove that $$B_J(B^*_I(g)) \backslash g \subseteq B^*_I(g)$$

(If the sets x and y are contained in a third set z then also there least upper bound $x \cup y$ is contained within z.) Assume now that s is some state in $B_J(B^*_I(g)) \backslash g$. Then by definition of $B_J(\_)$ the following holds:

$$\forall s' \in S\ s =_J s' \Rightarrow \exists e, o, s'', s' \xrightarrow{e\ o} s'' \text{ and } s'' \in B^*_I(g) \quad (3)$$

To check that s is in $B^*_I(g)$ it is necessary to prove that the following holds:

$$\forall s' \in S\ s =_I s' \Rightarrow \exists e, o, s''', s' \xrightarrow{e\ o} s''' \text{ and } s''' \in B^*_I(g) \quad (4)$$

We will therefore argue that for all s' satisfying $s =_I s'$, e, o, and s''' exists such that $$s' \xrightarrow{e\ o} s'''$$

and $s''' \in B^*_I(g)$. Now, if s' is such that also $S = j\ S'$ we can take $s''' = s''$, (4) then follows from (3) and we are done. If s' is such that $s =_I s'$ but $s \neq_J s'$ we proceed as follows. Define $\tilde{s}'$ by $$\tilde{s}'_i = \begin{cases} s'_i & \text{if } i \in I \\ s_i & \text{if } i \in J \setminus I \\ s_i & \text{if } i \notin J \end{cases}$$

It follows from this definition that $\tilde{s}' =_I s'$ and $\tilde{s}' =_J s$, i.e., by (3) e, o, and $\tilde{s}''$ exists such that $$\tilde{s}' \xrightarrow{e\ o} \tilde{s}''$$

and $\tilde{s}'' \in B^*_I(g)$. Since I is dependency closed and $\tilde{s}' =_I s'$, it follows that for all $$s' \xrightarrow{e\ o}_i \tilde{s}''_i.$$

Hence, there s''' exists such that $$s' \xrightarrow{e\ o} s'''$$

and $\tilde{s}''_i = s'_i$ for all $i \in I$. As $B^*_I(g)$ is I-sorted, it is concluded that $s''' \in B^*_I(g)$ proving (4).

Computer System

Figure 25:
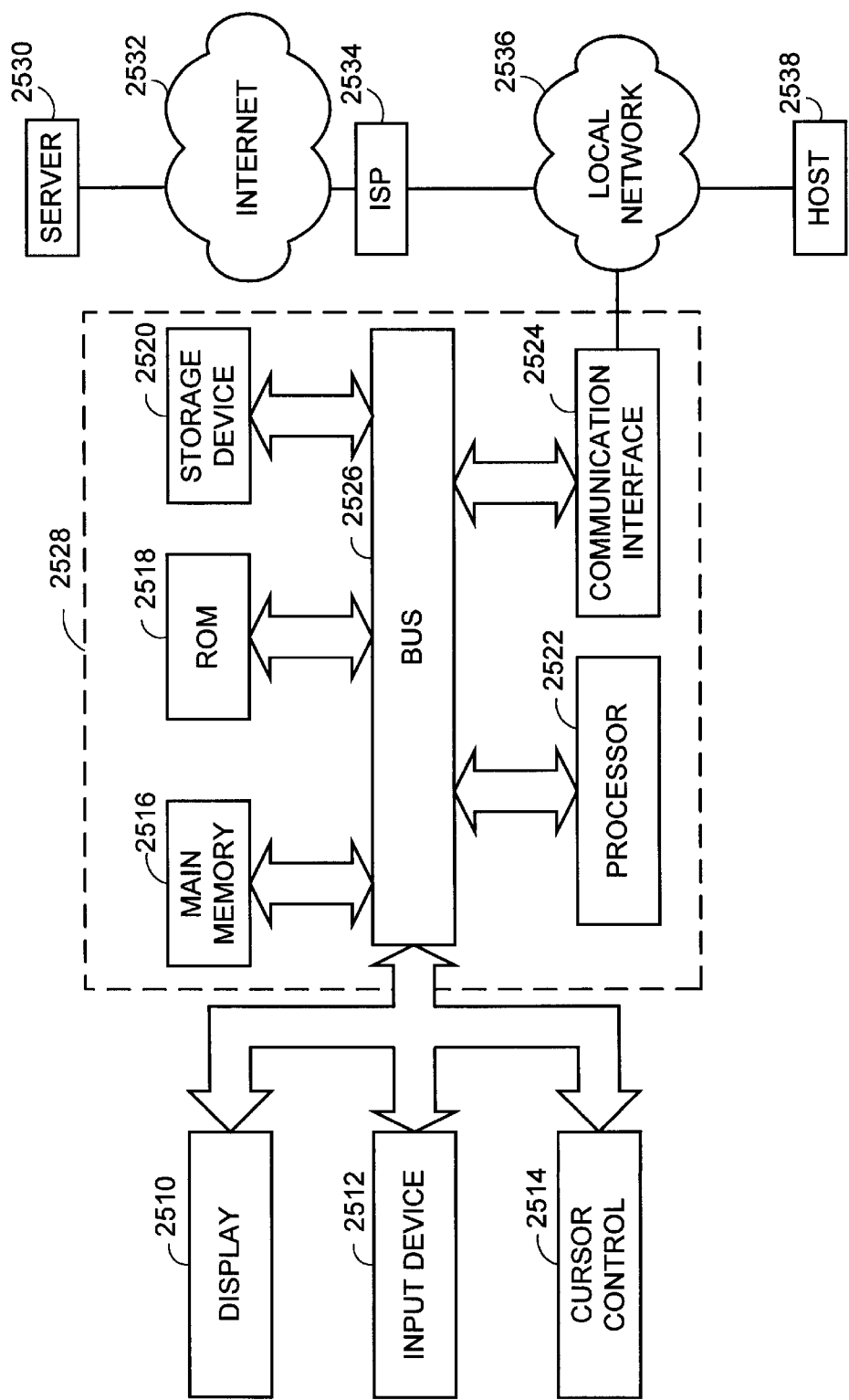
FIG. 25 is a block diagram showing a computer system which may be used to implement the state based system model analysis system consistent with the principles of the invention.

FIG. 25 is a block diagram illustrating a computer system that may be used to implement the apparatus and methods for analyzing a state based system model consistent with the present invention. Computer system 2528 is a general purpose computer system that includes main memory 2516, read only memory (ROM) 2518, storage device 2520, processor 2522, and communication interface 2524, all interconnected by bus 2526. Bus 2526 also connects computer system 2528 to display 2510, input device 2512, and cursor control 2514.

In one embodiment, main memory 2516 is a random access memory (RAM) or a dynamic storage device that stores instructions executed by processor 2522. Main memory 2516 may also store information used in executing instructions. ROM 2518 is used for storing static information and instructions used by processor 2522. Storage device 2520, such as a magnetic or optical disk, also stores instructions and information used in operating computer system 2528.

Display 2510 may be a cathode ray tube (CRT) or other type of display device. Input device 2512 is used by a user to input data and commands to processor 2522 to allow the user to interact with the system. Cursor control 2514 controls cursor movement on display 2510. Cursor control 2514 may be, for example, a mouse, a trackball or cursor direction keys.

Processor 2522 executes the operations described herein. For example, processor 2522 may execute program code stored in a computer readable medium such as main memory 2516 to carry out the apparatus elements and method steps described above.

Apparatus and methods consistent with the invention are related to the use of computer system 2528 for analyzing a state based system model. According to one embodiment of the invention, a state based system model is analyzed by computer system 2528 in response to processor 2522 executing one or more sequences of instructions contained in main memory 2516. Such instructions may be read into main memory 2516 from another computer-readable medium, such as storage device 2520. Execution of instructions contained in main memory 2516 causes processor 2522 to perform the process steps consistent with the invention described herein. Execution of instructions contained in main memory 2516 also causes processor 2522 to implement apparatus elements that perform the process steps. Hardwired circuitry may be used in place of, or in combination with, software instructions to implement the invention. Thus, embodiments of the invention are not limited to any specific combination of hardware circuitry and software.

The term "computer-readable medium" as used herein refers to any medium that participates in providing instructions to processor 2522 for execution. Such a medium may take many forms, including but not limited to, non-volatile memory media, volatile memory media, and transmission media. Non-volatile memory media includes, for example, optical or magnetic disks, such as storage device 2520. Volatile memory media includes RAM, such as main memory 2516. Transmission media includes coaxial cables, copper wire and fiber optics, including the wires that comprise bus 2526. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic storage medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read and use.

Various forms of computer-readable media may be involved in carrying instructions to processor 2522 for execution. For example, the instructions may initially be carried on a magnetic disk or a remote computer. The remote computer can load the instructions into its dynamic memory and send the instructions over a telephone line using a modem. A modem local to computer system 2528 can receive the data on the telephone line and use an infra-red transmitter to convert the data to an infra-red signal. An infra-red detector coupled to appropriate circuitry can receive the data carried in the infra-red signal and place the data on bus 2526. Bus 2526 carries the data to main memory 2516, from which processor 2522 retrieves and executes the instructions. The instructions received by main memory 2516 may optionally be stored on storage device 2520 either before or after execution by processor 2522.

Computer system 2528 also includes a communication interface 2524 coupled to bus 2526. Communication interface 2524 provides two way communication to other systems, such as a local network 2536. For example, communication interface 2524 may be an integrated services digital network (ISDN) card or a modem to provide a data communication connection to a corresponding type of telephone line. Communication interface 2524 may also be, for example, a local area network (LAN) card to provide communication to a LAN. Communication interface 2524 may also be a wireless card for implementing wireless communication between computer system 2528 and wireless systems. In any such implementation, communication interface 2524 sends and receives electrical, electromagnetic or optical signals that carry data streams representing various types of information.

The link between communication interface 2524 and local network 2536 may provide data communication to one or more networks or other devices. For example, the link may provide a connection through local network 2536 to a host computer 2538 or to data equipment operated by an Internet Service Provider (ISP) 2534. ISP 2534 provides data communication services through the world wide packet data communications network now commonly referred to as the "Internet" 2532. Local network 2536 and Internet 2532 both use electrical, electromagnetic or optical signals that carry digital data streams. The signals through the various networks and the signals between communication interface 2524 and local network 2536, which carry the digital data to and from computer system 2528, are exemplary forms of carrier waves transporting the information.

Computer system 2528 can send messages and receive data, including program code, through the network(s) via the link between communication interface 2524 and local network 2536. For example, a server 2530 might transmit a requested code for an application program through Internet 2532, ISP 2534, local network 2536, and communication interface 2524.

Program code received over the network may be executed by processor 2522 as it is received, and/or stored in memory, such as in storage device 2520, for later execution. In this manner, computer system 2528 may obtain application code in the form of a carrier wave.

What is claimed is:

1. A computer-implemented method of performing a reachability check of a state based system model comprising a set of machines (MI, . . .Mn), said machines each comprising at least one possible state (pSIMi, . . . ,pSkMi), each machine being in one of its comprised states at any given time, the dynamic behavior of said machines (MI, . . . ,Mn) being defined by predefined transitions between said states of each machine (MI, . . . ,Mn) and dependencies (D) between said machines (MI, . . . ,Mn), comprising:

an initial set of at least one machine state (F) of said machine (MI, . . . ,Mn);

initiating a goal set of machine states (A) representing a condition on states of a subset of machines (MI); and repeating the following steps until the analyzing has terminated positively and/or if the subset of machines (MI) comprises all of said machines (MI, . . . ,Mn):

expanding the goal set (A) with a set of states which, via transitions, can be brought into the previous goal set (A) independently of machines not included in (MI), if (A) comprises at least one of the machine states in the initial set of states (F) then terminating positively; and otherwise expanding the subset of machines (MI) with at least a subset of the machines (MI, . . . ,Mn); and indicating the results of the reachability check to a user to allow the user to verify whether or not reachability can be achieved.

2. The method of performing a reachability check of a state based system model according to claim 1, wherein the step of expanding (MI) with at least a subset of the machines (MI, . . . ,Mn) comprises an expansion of (MI) with at least a subset of machines upon which the previous (MI) depends.

3. The method of performing a reachability check of a state based system model according to claim 2, wherein the analyzing is terminated negatively, if after said step of expanding the goal set (A) with a set of states which can be brought into the previous goal set (A) independently of machines not included in (MI) none of the machines in (MI) are dependent on machines outside (MI).

4. The method of performing a reachability check of a state based system model according to claim 1, wherein a visual or audio indication is provided to a user if, after said step of expanding the goal set (A) with a set of states ,which can be brought into the previous goal set (A) independently of machines not included in (MI), none of the machines in (MI) are dependent on machines outside (MI).

5. The method of performing a reachability check of a state based system model according to claim 1, wherein the analyzing performing a reachability check is terminated upon a request from the user.

6. The method of performing a reachability check of a state based system model according to claim 1, wherein the dependencies (D) are represented as a directed graph.

7. The method of performing a reachability check of a state based system model according to claim 1, wherein the increasing sets of machines (MI) are determined by a breadth-first traversal of the directed graph representing dependencies.

8. The method of performing a reachability check of a state based system model according to claim 1, wherein the sets of machine states are represented as Reduced Ordered Binary Decision Diagrams (ROBDD's) and the operations upon them are carried out as efficient operations on Reduced Ordered Binary Decision Diagrams (ROBDD's).

9. The method of performing a reachability check of a state based system model according to claim 1, wherein the transitions are represented as a partitioned transition relation of Reduced Ordered Binary Decision Diagrams (ROBDD's).

10. The method of performing a reachability check of a state based system model according to claim 1, wherein the set of states (A) are dynamically computed by an iterative fixed-point iteration.

11. A computer-implemented method of performing a reachability check of a state based system model comprising a set of machines (MI, . . . ,Mn), said machines each comprising at least one possible state (pSIMi, . . . ,pSkMi), each machine being in one of its comprised states at any given time, the dynamic behavior of said machines (MI, . . . ,Mn) being defined by predefined transitions between said states of each machine (MI, . . . ,Mn) and dependencies (D) between said machines (MI, . . . ,Mn), comprising:

for each machine (MI, . . . ,Mi, . . . ,Mn);

initiating a subset of machine (MI) comprise the currently analyzed machine (Mi);

initiating a set (Ai) of living states (Ai), said living states being the machine states of the currently analyzed machine (Mi) which, independently of other machines change state to other possible states (pSIMi, . . . , pSkMi) of said machine; and repeating the following steps until the performing a reachability check has terminated or if (MI) comprises all machines (MI, . . . Mn):

expanding the set of living states (Ai) with a set of states which, via transitions, can be brought into the previous set of living states (Ai) independently of machines not included in (MI) and/or a set of states which, via transitions, can be brought to change state of (Mi) independently of machines not included in (MI) terminating the performing a reachability check positively if (Ai) comprises all possible machine states in said machine (Mi), otherwise expanding (MI) with at least a subset of the machines; and indicating the results of the reachability check to a user to allow the user to verify whether or not reachability can be achieved.

12. The method of performing a reachability check of a state based system model according to claim 11, wherein the step of expanding (MI) with at least a subset of the machines comprises an expansion of (MI) with at least a subset of machines upon which the previous (MI) depends.

13. The method of performing a reachability check of a state based system model according to claim 12, wherein the performing a reachability check is terminated negatively if, after said step of expanding the set of living states (Ai) with a set of states which via transitions can be brought into the previous set of living states (Ai) and/or a set of states which via transitions can be brought to change state of (Mi) independently of machines not included in (MI), none of the machines in (MI) are independent on machines outside (MI).

14. The method of performing a reachability check of a state based system model according to claim 11, wherein the dependencies (D) are represented as a directed graph.

15. The method of performing a reachability check of a state based system model according to claim 11, wherein the increasing sets of machines (MI) are determined by a breadth-first traversal of the directed graph representing dependencies.

16. The method of performing a reachability check of a state based system model according to claim 11, wherein the sets of machine states are represented as Reduced Ordered Binary Decision Diagrams (ROBDD's) and the operations upon them are carried out as efficient operations on Reduced Ordered Binary Decision Diagrams (ROBDD's).

17. The method of performing a reachability check of a state based system model according to claim 11, wherein the transitions are represented as a partitioned transition relation of Reduced Ordered Binary Decision Diagrams (ROBDD's).

18. The method of performing a reachability check of a state based system model according to claim 11, wherein the set of states (A) are dynamically computed by an iterative fixed-point iteration.

19. The method of performing a reachability check of a state based system model according to claim 11, wherein a set of potential dead machine states (Adi) are determined for each machine (Mi) as the possible machine states which are not in the determined set of living machine states (Ai).

20. The method of performing a reachability check of a state based system model according to claim 19, wherein the method further comprises the steps of:

for each machine (Mi) having potential dead machine states (Adi) initiating an initial set of machine states (F) of said machines (MI, . . . ,Mn);

initiating a goal set of machine states (Adi) representing the potential dead machine states of machine (M2); and repeating the following steps until the performing a reachability check has terminated and/or if the subset of machines (MI) comprises all of said machines (MI, . . . , Mn):

expanding the goal set (Adi) with a set of states which via transitions can be brought into the previous goal set (Adi) independently of machines not included in (MI), if (Adi) comprises at least one of the states in the initial set of states (F) then terminating positively, otherwise expanding the subset of machines (MI) with at least a subset of the machines (MI, . . . ,Mn).

21. The method of performing a reachability check of a state based system model according to claim 20, wherein the step of expanding (MI) with at least a subset of the machines (MI, . . . ,Mn) comprises an expansion of (MI) with at least a subset of machines upon which the previous (MI) depends.

22. The method of performing a reachability check of a state based system model according to claim 20, wherein the performing a reachability check is terminated negatively if, after said step of expanding the goal set (Adi) with a set of states which can be brought into the previous goal set (Adi) independently of machines not included in (MI), none of the machines in (MI) are dependent on machines outside (MI).

23. The method of performing a reachability check of a state based system model according to claim 20, wherein a visual or audio indication is provided to a user if, after said step of expanding the goal set (Adi) with a set of states which can be brought into the previous goal set (Adi) independently of machines not included in (MI), none of the machines in (MI) are dependent on machines outside (MI).

24. The method of performing a reachability check of a state based system model according to claim 20, wherein the dependencies (D) are represented as a directed graph.

25. The method of performing a reachability check of a state based system model according to claim 20, wherein the increasing sets of machines (MI) are determined by a breadth-first traversal of the directed graph representing dependencies.

26. The method of performing a reachability check of a state based system model according to claim 20, wherein the sets of machine states are represented as Reduced Ordered Binary Decision Diagrams (ROBDD's) and the operations upon them are carried out as efficient operations on Reduced ordered Binary Decision Diagrams (ROBDD's).

27. The method of performing a reachability check of a state based system model according to claim 20, wherein the transitions are represented as a partitioned transition relation of Reduced Ordered Binary Decision Diagrams (ROBDD's).

28. The method of performing a reachability check of a state based system model according to claim 20, wherein the set of states (Adi) are dynamically computed by an iterative fixed-point iteration.

29. A computer-implemented method of performing a reachability check of a state based system model comprising a set of machines (MI, . . . ,Mn), said machines each comprising at least one possible state (pSIMi, . . . ,pSkMi), each machine being in one of its comprised states at any given time, the dynamic behavior of said machines (MI, . . . ,Mn) being defined by predefined transitions between said states of each machine (MI, . . . ,Mn) and dependencies (D) between said machines (MI, . . . ,Mn), comprising:

for at least one machine (Mi) determining at least one of the potential dead machine states (Adi) which, when said machine (Mi) is in any of said machine states (Adi), independently of possible external events, will remain in the same dead machine state (Adi);

for each machine (Mi) having potential dead machine states (Adi) initiating an initial set of machine states (F) of said machines (MI, . . . ,Mn);

initiating a goal set of machine states (Adi) representing the potential dead machine states of machines (MI); and repeating the following steps until the performing of a reachability check has terminated and/or if the subset of machines (MI) comprises all of said machines (MI, . . . Mn):

expanding the goal set (Adi) with a set of machine states which, via transitions, can be brought into the previous goal set (Adi) independently of machines not included in (MI);

if (Adi) comprises at least one of the machine states in the initial set of states (F) then terminating positively; and otherwise expanding the subset of machines (MI) with at least a subset of the machines (MI, . . . ,Mn); and indicating the results of the reachability check to a user to allow the user to verify whether or not reachability can be achieved.

30. The method of performing a reachability check of a state based system model according to claim 29, wherein the step of expanding (MI) with at least a subset of the machines (MI, . . . ,Mn) comprises an expansion of (MI) with at least a subset of machines upon which the previous (MI) depends.

31. The method of performing a reachability check of a state based system model according to claim 30, wherein the performing a reachability check is terminated negatively if, after said step of expanding the goal set (Adi) with a set of states which can be brought into the previous goal set (Adi) independently of machines not included in (MI), none of the machines in (MI) are dependent on machines outside (MI).

32. The method of performing a reachability check of a state based system model according to claim 29, wherein the dependencies (D) are represented as a directed graph.

33. The method of performing a reachability check of a state based system model according to claim 29, wherein the increasing sets of machines (MI) are determined by a breadth-first traversal of the directed graph representing dependencies.

34. The method of performing a reachability check of a state based system model according to claim 29, wherein the sets of machine states are represented as Reduced Ordered Binary Decision Diagrams (ROBDD's) and the operations upon them are carried out as efficient operations on Reduced ordered Binary Decision Diagrams (ROBDD's).

35. The method of performing a reachability check of a state based system model according to claim 29, wherein the transitions is represented as a partitioned transition relation of Reduced ordered Binary Decision Diagrams (ROBDD's).

36. The method of performing a reachability check of a state based system model according to claim 29, wherein the set of states (Adi) are dynamically computed by an iterative fixed-point iteration.

37. A computer-implemented method of performing a reachability check of a state based system model comprising a set of machines (MI, . . . ,Mn), said machines each comprising at least one possible state (pSIMi, . . . ,pSkMi) and each machine being in one of its comprised states at any given time, the dynamic behavior of said machines (MI, . . . ,Mn) being defined by predefined transitions between said states of each machine (MI, . . . ,Mn) and dependencies (D) between said machines (MI, . . . ,Mn), comprising:

considering a method B for expanding sets of machine states with respect to transitions of a given set of machines (MI), where such a method B is well-formed, provided that, whenever B is applied with respect to a set of machines (MI) in order to expand a set of machine states X containing another set of machine states Y, the expansion of said set X contains the expansion obtained by applying B with respect to (MI) to said set Y, and whenever (MI) and (Mi) are sets of machines so that (MJ) contains at least the machines of (MI), the expansion obtained by applying B with respect to (Mi) to a set of machine states X contains at least the expansion obtained by applying B with respect to (MI) to said set X;

initiating an initial set of machine states (F) of said machines (MI, . . . ,Mn);

initiating a goal set of machine states (A) representing a condition on states of a subset of machines (MI); and repeating the following steps until the analyses has terminated or (MI) comprises all machines (MI, . . . Mn):
(a) expanding the goal set (A) using said method B with respect to (MI) at least once, preferably until the goal set (A) is identical to the previous (A); and
(b) expanding (MI) with a subset of machines; and indicating the results of the reachability check to a user to allow the user to verify whether or not reachability can be achieved.

38. The method of performing a reachability check of a state based system model according to claim 37, wherein the analyses is terminated after said step of expanding the goal set (A) using said method B with respect to (MI) at least once, preferably until the goal set (A) is identical to the previous (A), when the goal set (A) contains at least one of the states in (F).

39. The method of performing a reachability check of a state based system model according to claim 37, wherein the analyses is terminated after said step of expanding the goal set (A) using said method B with respect to (MI) at least once, preferably until the goal set (A) is identical to the previous (A), when the goal set (A) contains all machine states.

40. The method of performing a reachability check of a state based system model according to claim 37, wherein the analysis is terminated after said step of expanding the goal set (A) using said method B with respect to (MI) at least once, preferably until the goal set (A) is identical to the previous (A), if none of the machines in (MI) is dependent on machines outside (MI).

41. The method of performing a reachability check of a state based system model according to claim 37, wherein the expansion of (MI) in said step of expanding the goal set (A) using said method B with respect to (MI) at least once, preferably until the goal set (A) is identical to the previous (A), is restricted to a set of machines up on which the previous (MI) depends.

42. A computer-readable medium having stored thereon instructions for performing a reachability check of a state based system model comprising a set of machines (MI, . . . ,Mn), said machines each comprising at least one possible state (pSiMi, . . . ,pSkMi), each machine being in one of its comprised states at any given time, the dynamic behavior of said machines (MI, . . . ,Mn) being defined by predefined transitions between said states of each machine (MI, . . . , Mn) and dependencies (D) between said machines (MI, . . . ,Mn), including instructions which, when executed by a processor, cause the processor to perform the steps of:
  initiating an initial set of at least one machine state (F) of said machines (MI, . . . ,Mn);
  initiating a goal set of machine states (A) representing a condition on states of a subset of machines (MI); and
  repeating the following steps until the performing of a reachability check has terminated positively and/or if the subset of machines (MI) comprises all of said machines (MI, . . . ,Mn):
  expanding the goal set (A) with a set of states which, via transitions, can be brought into the previous goal set (A) independently of machines not included in (MI), if (A) comprises at least one of the machine states in the initial set of states (F) then terminating positively; and otherwise expanding the subset of machines (MI) with at least a subset of the machines (MI, . . . ,Mn); and
  indicating the results of the reachability check to a user to allow the user to verify whether or not reachability can be achieved.

43. The computer-readable medium of claim 42, further including instructions for performing the expanding of (MI) with at least a subset of the machines (M1, . . . ,Mn) by expanding (MI) with at least a subset of. machines upon which the previous (MI) depends.

44. The computer-readable medium of claim 43, further including instructions for terminating the performing a reachability check negatively, if after said stop of expanding the goal set (A) with a set of states which can be brought into the previous goal set (A) independently of machines not included in (MI) none of the machines in (MI) are dependent on machines outside (MI).

45. The computer-readable medium of claim 42, further including instructions for providing a visual or audio indication to a user if, after said step of expanding the goal set (A) with a set of states which can be brought into the previous goal set (A) independently of machines not included in (MI), none of the machines in (MI) are dependent on machines outside (MI).

46. The computer-readable medium of claim 42, further including instructions for terminating the performing a reachability check of upon a request from the user.

47. The computer-readable medium of claim 42, further including instructions for representing the dependencies (D) as a directed graph.

48. The computer-readable medium of claim 42, further including instructions for determining the increasing sets of machines (MI) by a breadth-first traversal of the directed graph representing dependencies.

49. The computer-readable medium of claim 42, further including instructions for representing the sets of machine states as Reduced Ordered Binary Decision Diagrams (ROBDD's) and the operations upon them are carried out as efficient operations on Reduced Ordered Binary Decision Diagrams (ROBDD's).

50. The computer-readable medium of claim 42, further including instructions for representing the transitions as a partitioned transition relation of Reduced Ordered Binary Decision Diagrams (ROBDD's).

51. The computer-readable medium of claim 42, further including instructions for dynamically computing the set of states (A) an iterative fixed-point iteration.

52. A computer-readable medium having stored thereon instructions for performing a reachability check of a state based system model comprising a set of machines (MI, . . . ,Mn), said machines each comprising at least one possible state (pS1Mi, . . . ,pSkMi), each machine being in one of its comprised states at any given time, the dynamic behavior of said machines (MI, . . . ,Mn) being defined by predefined transitions between said states of each machine (MI, . . . ,Mn) and dependencies (D) between said machines (MI, . . . ,Mn), including instructions which, when executed by a processor, cause the processor to perform the steps of:
  for each machine (MI, . . . ,Mi, . . . ,Mn) initiating a subset of machines (MI) to comprise the currently analyzed machine (Mi);
  initiating a set (Ai) of living states (Ai), said living states being the machine states of the currently analyzed machine (Mi) which, independently of other machines change state to other possible states (pS1Mi, . . . , pSkMi) of said machine; and
  repeating the following steps until the analyzing performing a reachability check has terminated or if (MI) comprises all machines (MI, . . . ,Mn):
  expanding the set of living states (Ai) with a set of states which, via transitions, can be brought into the previous set of living states (Ai) independently of machines not included in (MI) and/or a set of states which, via transitions, can be brought to change state of (Mi) independently of machines not included in (MI) terminating the performing a reachability check positively if (Ai) comprises all possible machine states in said machine (Mi), otherwise expanding (MI) with at least a subset of the machines; and
  indicating the results of the reachability check to a user to allow the user to verify whether or not reachability can be achieved.

53. The computer-readable medium of claim 52, further including instructions for performing the step of expanding (MI) with at least a subset of the machines by expanding (MI) with at least a subset of machines upon which the previous (MI) depends.

54. The computer-readable medium of claim 53, further including instructions for terminating the performing a reachability check negatively if, after said step of expanding the set of living states (Ai) with a set of states which via transitions can be brought into the previous set of living states (Ai) and/or a set of states which via transitions can be brought to change state of (Mi) independently of machines not included in (MI), none of the machines in (MI) are dependent on machines outside (MI).

55. The computer-readable medium of claim 52, further including instructions for representing the dependencies (D) as a directed graph.

56. The computer-readable medium of claim 52, further including instructions for determining the increasing sets of machines (MI) by a breadth-first traversal of the directed graph representing dependencies.

57. The computer-readable medium of claim 52, further including instructions for representing the sets of machine states as Reduced Ordered Binary Decision Diagrams (ROBDD's) and the operations upon them are carried out as efficient operations on Reduced Ordered Binary Decision Diagrams (ROBDD's).

58. The computer-readable medium of claim 52, further including instructions for representing the transitions as a partitioned transition relation of Reduced Ordered Binary Decision Diagrams (ROBDD's).

59. The computer-readable medium of claim 52, further including instructions for dynamically computing the set of states (A) by an iterative fixed-point iteration.

60. The computer-readable medium of claim 52, further including instructions for determining a set of potential dead machine states (Adi) for each machine (Mi) as the possible machine states which are not in the determined set of living machine states (Ai).

61. The computer-readable medium of claim 60, wherein for each machine (Mi) having potential dead machine states (Adi) initiating an initial set of machine states (F) of said machines (MI, . . . ,Mn), the computer-readable medium includes instructions for:

initiating a goal set of machine states (Adi) representing the potential dead machine states of machine (M2); and repeating the following steps until the performing a reachability check has terminated and/or if the subset of machines (MI) comprises all of said machines (MI, . . . ,Mn):

expanding the goal set (Adi) with a set of states which via transitions can be brought into the previous goal set (Adi) independently of machines not included in (MI), if (Adi) comprises at least one of the states in the initial set of states (F) then terminating positively, otherwise expanding the subset of machines (MV with at least a subset of the machines (MI, . . . ,Mn).

62. The computer-readable medium of claim 61, further including instructions for performing the step by expanding (MI) with at least a subset of the machines (Ml, . . . ,Mn) by expanding (MI) with at least a subset of machines upon which the previous (MI) depends.

63. The computer-readable medium of claim 61, further including instructions for terminating the performing a reachability check negatively if, after said step of expanding the goal set (Adi) with a set of states which can be brought into the previous goal set (Adi) independently of machines not included in (MI), none of the machines in (MI) are dependent on machines outside (MI).

64. The computer-readable medium of claim 61, further including instructions for providing a visual or audio indication to a user if, after said step of expanding the goal set (Adi) with a set of states which can be brought into the previous goal set (Adi) independently of machines not included in (MI), none of the machines in (MI) are dependent on machines outside (MI).

65. The computer-readable medium of claim 61, further including instructions for representing the dependencies (D) as a directed graph.

66. The computer-readable medium of claim 61, further including instructions for determining the increasing sets of machines (MI) by a breadth-first traversal of the directed graph representing dependencies.

67. The computer-readable medium of claim 62, further including instructions for representing the sets of machine states as Reduced Ordered Binary Decision Diagrams (ROBDD's) and the operations upon them are carried out as efficient operations on Reduced Ordered Binary Decision Diagrams (ROBDD's).

68. The computer-readable medium of claim 61, further including instructions for representing the transitions as a. partitioned transition relation of Reduced Ordered Binary Decision Diagrams (ROBDD's).

69. The computer-readable medium of claim 61, further including instructions for dynamically computing the set of states (Adi) by an iterative fixed-point iteration.

70. A computer-readable medium having stored thereon sequences of instructions for performing a reachability check of a state based system model comprising a set of machines (MI, . . . ,Mn), said machines each comprising at least one possible state (pSiMi, . . . pSkMi), each machine being in one of its comprised states at any given time, the dynamic behavior of said machines (MI, . . . ,Mn) being defined by predefined transitions between said states of each machine (MI, . . . ,Mn) and dependencies (D) between said-machines (MI, . . . ,Mn), the sequences of instructions including instructions which, when executed by a processor, cause the processor to perform the steps of:

for at least one machine (Mi) determining at least one of the potential dead machine states (Adi) which, when said machine (Mi) is in any of said machine states (Adi), independently of possible external events, will remain in the same dead machine state (Adi);

for each machine (Mi) having potential dead machine states (Adi) initiating an initial set of machine states (F) of said machines (MI, . . . ,Mn);

initiating a goal set of machine states (Adi) representing the potential dead machine states of machines (MI); and repeating the following steps until the performing of a reachability check has terminated and/or if the subset of machines (MI) comprises all of said machines (MI, . . . ,Mn):

expanding the goal set (Adi) with a set of machine states which, via transitions, can be brought into the previous goal set (Adi) independently of machines not included in (MI); and if (Adi) comprises at least one of the machine states in the initial set of states (F) then terminating positively, otherwise expanding the subset of machines (MI) with at least a subset of the machines (MI, . . . ,Mn); and indicating the results of the reachability check to a user to allow the user to verify whether or not reachability can be achieved.

71. The computer-readable medium of claim 70, further including instructions for performing the step of expanding (MI) with at least a subset of the machines (MI, . . . ,Mn) by expanding (MI) with at least a subset of machines upon which the previous (MI) depends.

72. The computer-readable medium of claim 71, further including instructions for terminating the performing a reachability check negatively if, after said step of expanding the goal set (Adi) with a set of states which can be brought into the previous goal set (Adi) independently of machines not included in (MI), none of the machines in (MI) are dependent on machines outside (MI).

73. The computer-readable medium of claim 70, further including instructions for representing the dependencies (D) as a directed graph.

74. The computer-readable medium of claim 70, further including instructions for determining the increasing sets of machines (MI) by a breadth-first traversal of the directed graph representing dependencies.

75. The computer-readable medium of claim 70, further including instructions for representing the sets of machine states as Reduced Ordered Binary Decision Diagrams (ROBDD's) and the operations upon them are carried out. as efficient operations on Reduced Ordered Binary Decision Diagrams (ROBDD's).

76. The computer-readable medium of claim 70, further including instructions for representing the transitions as a partitioned transition relation of Reduced Ordered Binary Decision Diagrams (ROBDD's).

77. The computer-readable medium of claim 70, further including instructions for dynamically computing the set of states (Adi) by an iterative fixed-point iteration.

78. A computer-readable medium having stored thereon sequences of instructions for performing a reachability check of a state based system model comprising a set of machines (MI, . . . ,Mn), said machines each comprising at least one possible state (pSIMi, . . . ,pSkMi) and each machine being in one of its comprised states at any given time, the dynamic behavior of said machines (MI, . . . ,Mn) being defined by predefined transitions between said states of each machine (MI, . . . ,Mn) and dependencies (ID) between said machines (MI, . . . ,Mn), the sequences of instructions including instructions which, when executed by a processor, cause the processor to perform the steps of:

considering a method B for expanding sets of machine states with respect to transitions of a given set of machines (MI), where such a method B is well-formed provided that whenever B is applied with respect to a set of machines (MV in order to expand a set of machine states X containing another set of machine states Y, the expansion of said set X contains the expansion obtained by applying B with respect to (MI) to said set Y, and whenever (MI) and (MJ) are sets of machines so that (MJ) contains at least the machines of (MI), the expansion obtained by applying B with respect to (MJ) to a set of machine states X contains at least the expansion obtained by applying B with respect to (MI) to said set X;

initiating an initial set of machine states (F) of said machines (MI, . . . ,Mn);

initiating a goal set of machine states (A) representing a condition on states of a subset of machines (MI); and repeating the following steps until the analyses has terminated or (MI) comprises all machines (MI, . . . ,Mn):
(a) expanding the goal set (A) using said method B with respect to (MI) at least once, preferably until the goal set (A) is identical to the previous (A); and
(b) expanding (MI) with a subset of machines; and indicating the results of the reachability check to a user to allow the user to verify whether or not reachability can be achieved.

79. The computer-readable medium of claim 78, further including instructions for terminating the analyses after said step of expanding the goal set (A) using said method B with respect to (MI) at least once, preferably until the goal set (A) is identical to the previous (A), when the goal set (A) contains at least one of the states in (F).

80. The computer-readable medium of claim 78, further including instructions for terminating the analyses after said step of expanding the goal set (A) using said method B with respect to (MI) at least once, preferably until the goal set (A) is identical to the previous (A), when the goal set (A) contains all machine states.

81. The computer-readable medium of claim 78, further including instructions for terminating the analysis after said step of expanding the goal set (A) using said method B with respect to (MI) at least once, preferably until the goal set (A) is identical to the previous (A), if none of the machines in (MI) is dependent on machines outside (MI).

82. The computer-readable medium of claim 78, further including instructions for performing the expansion of (MI) in said expanding the goal set (A) using said method B with respect to (MI) at least once, preferably until the goal set (A) is identical to the previous (A), is restricted to a set of machines upon which the previous (MI) depends.

* * * * *

UNITED STATES PATENT AND TRADEMARK OFFICE
CERTIFICATE OF CORRECTION

PATENT NO. : 6,408,262 B1
DATED : June 18, 2002
INVENTOR(S) : Henrik Leerberg et al.

It is certified that error appears in the above-identified patent and that said Letters Patent is hereby corrected as shown below:

Title page,
Item [57], ABSTRACT,
Line 9, after "(M1, . . .,Mn)" delete the space.

Column 28,
Line 18, "(MI, . . .Mn)" should read -- (M1, . . .,Mn) --.
Line 19, "(pSIMi, . . . ,pSkMi)" should read -- (pS1Mi, . . . ,pSkMi) --.
Lines 21, 23 and 24, "(MI, . . .,Mn)" should read -- (M1, . . .,Mn) --.
Line 25, before "an initial" insert -- initiating --.
Line 26, "machine" should read -- machines --.
Lines 26, 31, 38 and 45, "(MI, . . .,Mn)" should read -- (M1, . . .,Mn) --.
Line 63, before "performing" delete "analyzing".

Column 29,
Line 22, "(MI, . . .,Mn)" should read -- (M1, . . .,Mn) --.
Line 23, "(pSIMi, . . . ,pSkMi)" should read -- (pS1Mi, . . . ,pSkMi) --.
Lines 26, 27, 28 and 40, "(MI, . . .,Mn)" should read -- (M1, . . .,Mn) --.
Line 30, "(MI, . . . ,Mi, . . . ,Mn)" should read -- (M1, . . . ,Mi, . . . ,Mn) --.
Line 31, "machine" should read -- machines --.
Lines 36-37, "(pSIMi, . . . ,pSkMi)" should read -- (pS1Mi, . . . ,pSkMi) --.

Column 30,
Lines 32, 45 and 49, "(MI, . . .,Mn)" should read -- (M1, . . .,Mn) --.
Lines 37-38, "(MI, . . .,Mn)" should read -- (M1, . . .,Mn) --.

Column 31,
Lines 22, 26, 27 and 28, "(MI, . . .,Mn)" should read -- (M1, . . .,Mn) --.
Line 23, "(pSIMi, . . . ,pSkMi)" should read -- (pS1Mi, . . . ,pSkMi) --.
Lines 36, 52 and 59, "(MI, . . .,Mn)" should read -- (M1, . . .,Mn) --.
Line 44, "(MI, . . .Mn)" should read -- (M1, . . .,Mn) --.

Column 32,
Lines 24, 28 and 29, "(MI, . . .,Mn)" should read -- (M1, . . .,Mn) --.
Line 25, "(pSIMi, . . . ,pSkMi)" should read -- (pS1Mi, . . . ,pSkMi) --.
Lines 30, 47 and 51, "(MI, . . .,Mn)" should read -- (M1, . . .,Mn) --.

UNITED STATES PATENT AND TRADEMARK OFFICE
CERTIFICATE OF CORRECTION

PATENT NO. : 6,408,262 B1
DATED : June 18, 2002
INVENTOR(S) : Henrik Leerberg et al.

It is certified that error appears in the above-identified patent and that said Letters Patent is hereby corrected as shown below:

Column 33,
Line 17, "up on" should read -- upon --.
Lines 21-22, "(MI, . . .,Mn)" should read -- (M1, . . .,Mn) --.
Line 23, "(pSIMi, . . . ,pSkMi)" should read -- (pS1Mi, . . . ,pSkMi) --.
Lines 25, 28, 32, 38 and 45, "(MI, . . .,Mn)" should read -- (M1, . . .,Mn) --.
Lines 26-27, "(MI, . . .,Mn)" should read -- (M1, . . .,Mn) --.

Column 34,
Lines 27, 30, 32, 33 and 46, "(MI, . . .,Mn)" should read -- (M1, . . .,Mn) --.
Line 35, "(MI, . . . ,Mi, . . . ,Mn)" should read -- (M1, . . . ,Mi, . . . ,Mn) --.

Column 35,
Lines 34, 41, 48 and 51, "(MI, . . .,Mn)" should read -- (M1, . . .,Mn) --.
Line 47, "(MV" should read -- (MI) --.

Column 36,
Line 15, after "as a" delete the period.
Lines 24, 27, 29, 30 and 40, "(MI, . . .,Mn)" should read -- (M1, . . .,Mn) --.
Line 25, "(pSiMi, . . . pSkMi)" should read -- (pS1Mi, . . . ,pSkMi) --.
Lines 47-48, "(MI, . . .,Mn)" should read -- (M1, . . .,Mn) --.
Lines 56 and 62, "(MI, . . .,Mn)" should read -- (M1, . . .,Mn) --.

Column 37,
Line 15, after "out" delete the period.
Lines 28, 31, 33 and 34, "(MI, . . .,Mn)" should read -- (M1, . . .,Mn) --.
Line 29, "(pSIMi, . . . ,pSkMi)" should read -- (pS1Mi, . . . ,pSkMi) --.
Line 41, "(MV" should read -- (MI) --.

UNITED STATES PATENT AND TRADEMARK OFFICE
CERTIFICATE OF CORRECTION

PATENT NO. : 6,408,262 B1
DATED : June 18, 2002
INVENTOR(S) : Henrik Leerberg et al.

It is certified that error appears in the above-identified patent and that said Letters Patent is hereby corrected as shown below:

<u>Column 38,</u>
Lines 7 and 11, "(MI, . . .,Mn)" should read -- (M1, . . .,Mn) --.

Signed and Sealed this

Eighteenth Day of February, 2003

JAMES E. ROGAN
*Director of the United States Patent and Trademark Office*